US010108907B2

(12) United States Patent
Bugay et al.

(10) Patent No.: US 10,108,907 B2
(45) **Date of Patent: *Oct. 23, 2018**

(54) METHOD AND SYSTEM TO PROVIDE RELATED DATA

(71) Applicant: Knoema Corporation, McLean, VA (US)

(72) Inventors: Vladimir Bugay, Perm (RU); Anton Firsov, Perm (RU); Vitalii Sytin, Perm (RU); Vladimir Eskin, Perm (RU)

(73) Assignee: Knoema Corporation, McLean, VA (US)

( * ) Notice: Subject to any disclaimer, the term of this patent is extended or adjusted under 35 U.S.C. 154(b) by 550 days.

This patent is subject to a terminal disclaimer.

(21) Appl. No.: 14/802,678

(22) Filed: Jul. 17, 2015

(65) Prior Publication Data

US 2017/0017897 A1 Jan. 19, 2017

(51) Int. Cl.

| | |
|---|---|
| ***G06N 99/00*** | (2010.01) |
| ***G06F 3/0484*** | (2013.01) |
| ***G06F 17/24*** | (2006.01) |
| ***G06F 17/27*** | (2006.01) |
| ***G06F 17/30*** | (2006.01) |

(52) U.S. Cl.
CPC ......... *G06N 99/005* (2013.01); *G06F 3/0484* (2013.01); *G06F 17/241* (2013.01); *G06F 17/246* (2013.01); *G06F 17/278* (2013.01); *G06F 17/2785* (2013.01); *G06F 17/2795* (2013.01); *G06F 17/30696* (2013.01)

(58) Field of Classification Search
CPC ...... G06N 99/005; G06N 5/022; G06N 5/025; G06F 3/0484; G06F 17/241; G06F 17/246; G06F 17/278; G06F 17/2705; G06F 17/2785; G06F 17/2795; G06F 17/30696; G06F 17/30654; G06F 17/30663
USPC ............................................................ 706/11
See application file for complete search history.

(56) References Cited

U.S. PATENT DOCUMENTS

| | | | | |
|---|---|---|---|---|
| 6,356,922 | B1 * | 3/2002 | Schilit | G06F 17/30014 707/999.003 |
| 8,032,822 | B1 * | 10/2011 | Artamonov | G06Q 40/123 704/9 |
| 2002/0026306 | A1 * | 2/2002 | Bangalore | G06F 17/271 704/9 |
| 2007/0204319 | A1 * | 8/2007 | Ahmad | G06F 17/30787 725/134 |

(Continued)

*Primary Examiner* — Dave Misir
(74) *Attorney, Agent, or Firm* — Schwegman Lundberg & Woessner, P.A.

(57) ABSTRACT

Methods and systems of providing related information to a source document are described. The method may include accessing the source document displayed to a user in a graphical user interface (GUI) of a client device. The source document includes numerical data and text. Discovered data corresponding to the numerical data included in the source document is then identified. Further, a database trained with a machine-learning algorithm to identify time series data related data associated with the text is accessed. The discovered data with a discovered data identifier and the time series related data is then displayed in the GUI. In example embodiments, the methods and systems described herein interact with applications such as spreadsheets applications, email clients, word processing applications, webpages and the like.

15 Claims, 21 Drawing Sheets

(56) References Cited

U.S. PATENT DOCUMENTS

| | | | | |
|---|---|---|---|---|
| 2008/0172362 | A1* | 7/2008 | Shacham | G06F 17/30696 |
| 2010/0145902 | A1* | 6/2010 | Boyan | G06F 17/3089<br>706/54 |
| 2013/0332450 | A1* | 12/2013 | Castelli | G06F 17/278<br>707/722 |
| 2014/0195884 | A1* | 7/2014 | Castelli | G06F 17/278<br>715/201 |
| 2016/0170814 | A1* | 6/2016 | Li | G06F 9/542<br>719/318 |
| 2017/0213157 | A1 | 7/2017 | Bugay et al. | |

* cited by examiner

─ 200

Country Profiles ─ 204

[210.1]
China

Discovered Claims ─ 206

| | | |
|---|---|---|
| 6.2% | China - Monthly Trade Data year ago | 1.5% | China - Monthly Trade Data year ago |
| 16.1% | Imports | 12% | Imports |
| 210.2 billion yuan | Trade Surplus | 18.6bn yuan | Trade Surplus |
| 6.4% | China - Exports | 16.2% | China - Exports |
| 7.4% | China - Economy | | |

Related Data
China - Exports of goods and services ─ 208

[Line chart showing China exports from 1970 to 2010, y-axis 0 to 50, labeled "— China"]

202 ─ China's monthly trade data has shown exports fell in April from a year ago by 6.2% in yuan terms compared to expectations for a rise of about 1.5%. Imports also fell fro the month by 16.1% in yuan terms compared to forecasts for a fall of about 12%. The numbers mean the country's trade surplus has risen to 210.2 billion yuan from 18.6bn yuan in March. Recent economic data from the mainland has shown further signs the China's slowdown is continuing. "The surplus rise] was mainly due to further import weakness," said Moody's analysts Alistair Chan in a note. "Imports have slowed on account of the housing slump and reduced demand for commodities, while exports have been softened on account of the uneven global recovery," he said. Economist Tony Nash of Delta Economics said there was clearly pressure on China's trade environment. "But the environment is improving and will continue through the second quarter," he said. "We see some difficulties in the third quarter, with recovery late in the year." In US dollar terms, China's exports for the month fell 6.4%, while imports fell 16.2%, and the trade surplus rose to $34.13bn. Some official numbers from the mainland are now reported by media in both currencies because of currency conversion factors based on US dollar and Chinese yuan movements over the last year. China's economy grew by 7.4% in 2014, its weakest for almost 25 years.

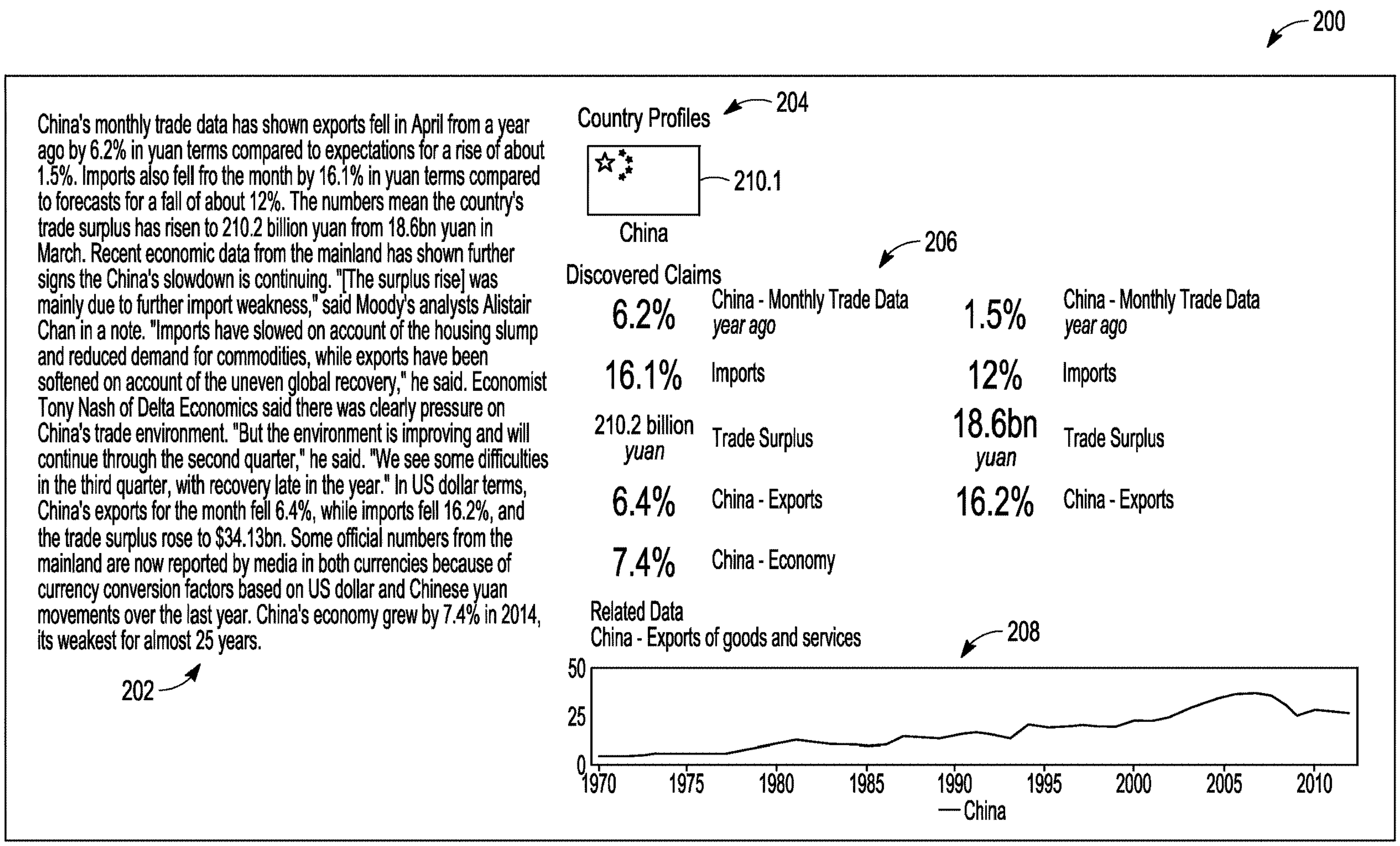

*FIG. 3*

METHOD AND SYSTEM TO PROVIDE RELATED DATA

TECHNICAL FIELD

The subject matter disclosed herein generally relates to machines that are configured to process data. More particularly, the present disclosure describes systems and methods to identify data related to a source document.

BACKGROUND

Documents such as news articles may provide information related to a given subject matter. For example, a news article on China may describe economic data related to the Chinese economy. However, a reader of the article is limited to the information available in the article. Further, factual information (e.g., Gross Domestic Product or GDP) may appear at various places (e.g., in different paragraphs) throughout the article.

With the advent of the Internet, vast repositories of public and open data, national and regional statistics are available. For example, Knoema Corporation has built a repository of public and open data enhanced by generic crowd-sourced data collection platform integrated with data and visualization tools. The platform operates in conjunction with a network of data collectors as part of a global initiative for collecting and aggregating data on various topics on a worldwide scale. Likewise, companies like Google provide access to a vast body of data including articles and other text documents on a multitude of topics.

BRIEF DESCRIPTION OF THE DRAWINGS

The present disclosure illustrates various embodiments by way of example and not limitation in the figures of the accompanying drawings. In the drawings, like references indicate similar elements and in which:

FIG. 3 shows a further example of the GUI of FIG. 2 including example source text and displaying data related to the source text;

DETAILED DESCRIPTION

Figure 1:
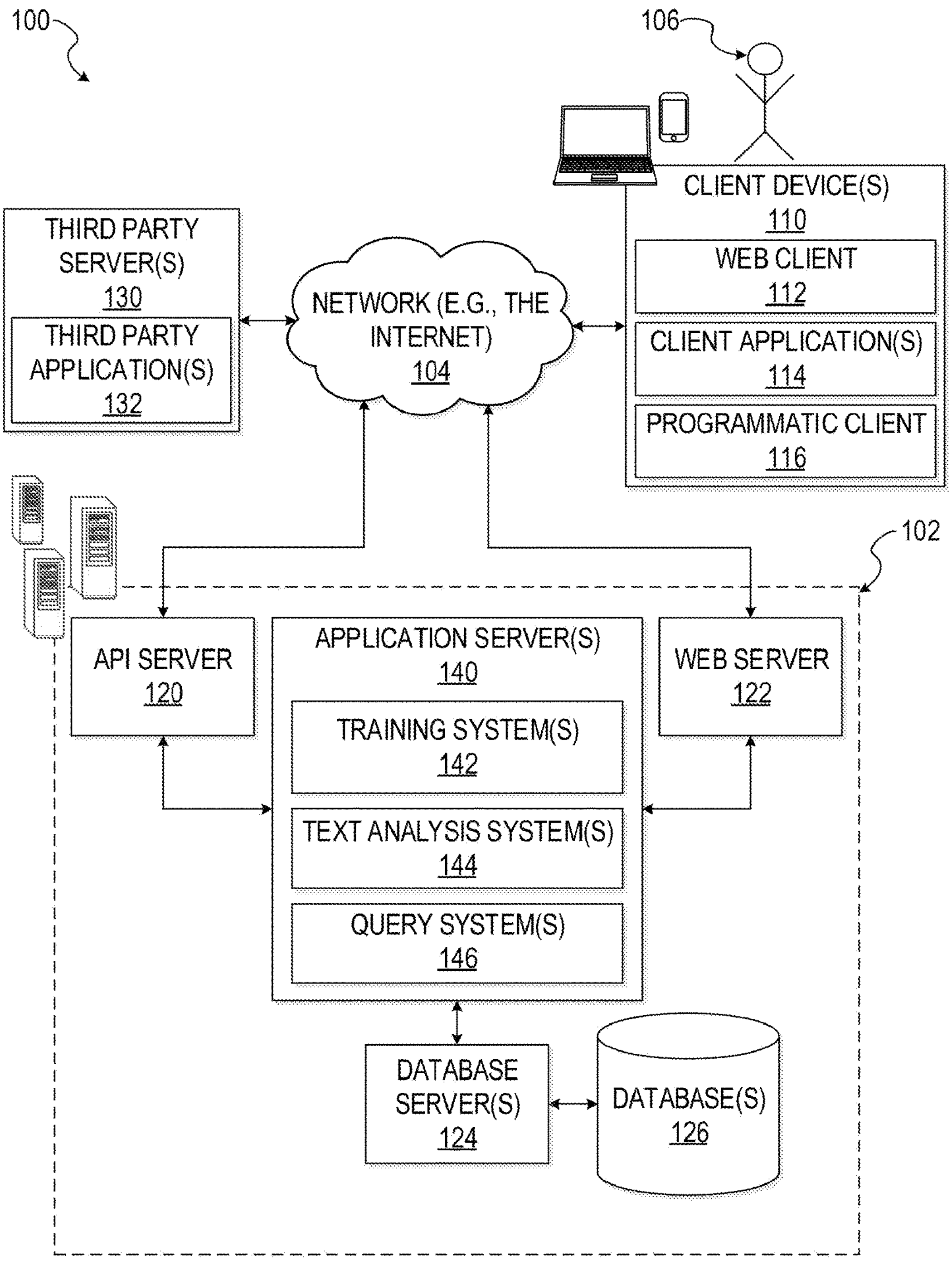
FIG. 1 is a high-level client-server-based network architecture, in accordance with an example embodiment, configured to identify data related to a source document.

In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Example methods and systems described herein are directed to systems and methods to provide data (e.g., information, related facts or claims, or the like) related to a source document to a user. The data may be presented as text (including numerical data) and/or graphically (e.g., bar charts, line charts etc.). In an example embodiment, data related to a source document (e.g., an article published on the Internet) is provided to the reader on-the-fly. For example, if a user is reading an article on his or her favorite sports team, and hence the source document relates to sports, facts and other sports related information may be presented to the user in an automated fashion. Likewise, if the user is a member of a sales team entering sales related data into a spreadsheet, and hence the source document relates to sales, facts and other sales related information may be presented to the use in an automated fashion. It should be noted that the methods and systems described herein apply to any source documents that include any content on any subject matter. The terms "fact" and "claim" are used interchangeably in this document. Thus the methods and systems described herein may, in some example embodiments, apply to assertions that are known to be true (e.g., facts) as well as assertions that may not necessarily be true (e.g., claims).

In an example embodiment, the related data may be facts or claims (e.g., attributed numeric values) and, accordingly, the source document may be an arbitrary formatted text or webpage. For example, when the source document includes numerical data (e.g., GDP, population growth, sales figures, or any other numerical values), the methods and systems described herein may identify this numerical data and provide a unified view of this numerical data in an associated display zone as described. Accordingly, for example, facts or claims in an article may be identified in various different paragraphs in a document and these s, together with their associated labels (e.g., GDP), may be displayed in a related data display zone. In additional to the example "discovered claims" identified in the article, time series data related to the source document may be obtained from a data repository and displayed to the user (e.g., in the form of one or more graphs).

Generally, the input text from the source document may be converted to raw text without any markup. Thereafter, the raw text may be parsed into sentences using a sentence detection algorithm, and the sentences may then be converted into syntax tree. The syntax tree may represent an underlying sentence as a tree of words tagged with their respective part of speech (POS) tags and relationships between words and parts of sentences. Thereafter, a machine learning (ML) model may be applied to produce related discovered data (e.g., facts, claims and/or attributed numerical data) found in the text and data related to the text from a data repository. In an example embodiment, provision of the related data is done automatically on the fly without any user intervention.

Referring to FIG. 1, an example embodiment of a high-level client-server-based network architecture 100, in accordance with an example embodiment, configured to identify data related to a source document is shown. The architecture 100 is shown to include a networked system 102 that implements at least some of the methods and systems described herein to provide data (e.g., information, related facts, or the like) to a user.

The networked system 102, in the example form of a network-based related data system, provides server-side functionality via a network 104 (e.g., the Internet or wide area network (WAN)) to users 106 each associated with one or more client devices 110. The client device 110 is shown by way of example to include a web client 112 (e.g., a browser, such as the Internet Explorer® browser developed by Microsoft® Corporation of Redmond, Wash.), one or more client applications 114, and a programmatic client 116 executing on the client device 110.

The networked system 102 is further shown to include an application program interface (API) server 120, a web server 122, a database server 124 coupled to one or more databases 126, and one or more application servers 140. The application server 140 is shown to include one or more training system(s) 142, text analysis system(s) 144, and query system(s) 146. The query system(s) 146 interface with the database server(s) 124 to access data in the database(s) 126. In an example embodiment, the database(s) 126 include data (e.g., data as provided by Knoema Corporation) on countries throughout the world (e.g., data available from many (e.g., hundreds) of databases). The networked system 102 is also shown to include third party server(s) 130 and third party applications 132.

The client device 110 may comprise, but is not limited to, a mobile phone, desktop computer, laptop, portable digital assistant (PDAs), smart phone, tablet, ultra book, netbook, laptop, multi-processor system, microprocessor-based or programmable consumer electronic, or any other communication device that a user may utilize to access the networked system 102. The client device 110 may comprise a display module to display information (e.g., in the form of user interfaces).

The client applications 114 may include a web browser, messaging application, electronic mail (email) application, and the like. Further, the client device 110 may include a related data application, in accordance with an example embodiment, that provides data or any other information related to a source document. It will be appreciated that the source document can be provided by another application. For example, when the user 106 is reading a news article in a browser on the client device 110, the related data application may interface with the browser application. Likewise, when the user 106 reads an email, the related data application may interface with the email application, and so on.

In some example embodiments, if the related data application is included in the client device 110 (e.g., as one of the client applications), then this client-side application may be configured to locally provide the user interface and at least some of the functionality described herein. The related data application may, however, be configured to communicate with the networked system 102, on an as needed basis, for data and/or processing capabilities not locally available (e.g., access to a knowledge database of related data). Conversely, if the related data application is not included in the client device 110, the client device 110 may use its web browser to access the networked system.

While the client-server-based network architecture 100 shown in FIG. 1 employs a client-server architecture, the present disclosure is of course not limited to such an architecture, and could equally well find application in a distributed, peer-to-peer, architecture system, or any other networked environment. Further, in example embodiments, the client-server-based network architecture 100 may be deployed using a virtual private cloud including frontend server(s), backend server(s), and database server(s) in the cloud.

As mentioned above, example methods and systems described herein are directed to systems and methods to provide related data (e.g., information, related facts, or the like) to a user based on a source document (e.g., an article the user is reading on an associated electronic device).

Figure 2:
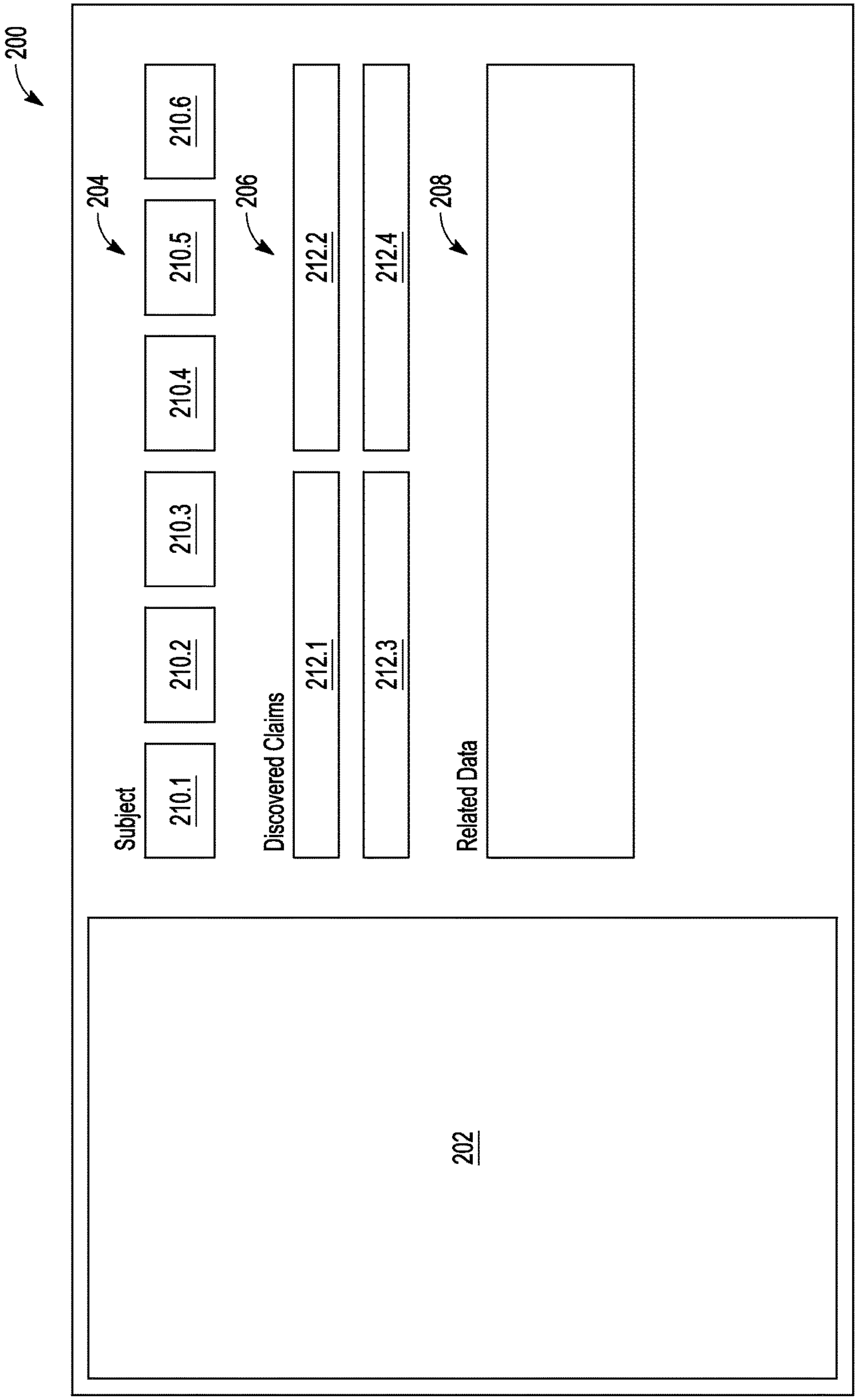
FIG. 2 shows a Graphical User Interface (GUI) to provide data related to a source document.

FIG. 2 shows a GUI 200 to provide data related to a source document. The GUI 200 is shown to include a document zone 202, a subject display zone 204, a discovered claims display zone 206, and a related data display zone 208. It should be noted that further or different display zones may be included in different example embodiments. The document zone 202 provides a text area in which a user may enter text. In another example embodiment, the document zone 202 allows a user to cut and paste text into the document zone 202 so that the text may be analyzed by the system and related data corresponding to the text may be obtained and displayed in the subject display zone 204, the discovered claims (or facts) display zone 206, and the related data display zone 208. For example, the document zone 202 may include an article that a user is reading and, in an automated fashion, the systems and methods described herein may analyze the article being read by the user and generate related facts corresponding to the article. The subject display zone 204 is shown to include identified topic identifiers 210.1-210.6, and the discovered claims display zone is shown to include discovered claims 212.1-212.4 that have been identified in the source document.

FIG. 3 shows a further example of the GUI 200 including example source text and display data related to the source text. For example, the document zone shows text relating to financial data in China. In an automated fashion, without human intervention, the systems and methods described herein may parse or analyze the text in the document zone 202 and identify related data. In the example embodiment shown, the document in zone 202 is an article on China and, hence, the subject display zone 204 is shown to include China (see topic 210.1) and the discovered claims display zone 206 is shown to include monthly trade data, imports, trade surplus, exports, and so on. It will be noted that in this example, the discovered claims have been extracted from the article in the document zone 202. The related data display zone 208 is shown to include a graph of exports of goods and services of China. In order to obtain this related data, it will be appreciated that machine learning technology may be utilized and various different databases may be accessed to identify data related to the content provided in the display zone 2204 Thus, in an example embodiment, the related data is not obtained merely by conventional searching but rather by using machine leaning technology. Further, the data in the document zone 202 may be provided by an article that a user is reading, be cut and pasted from another document into the GUI 200, and so on.

Figure 4:
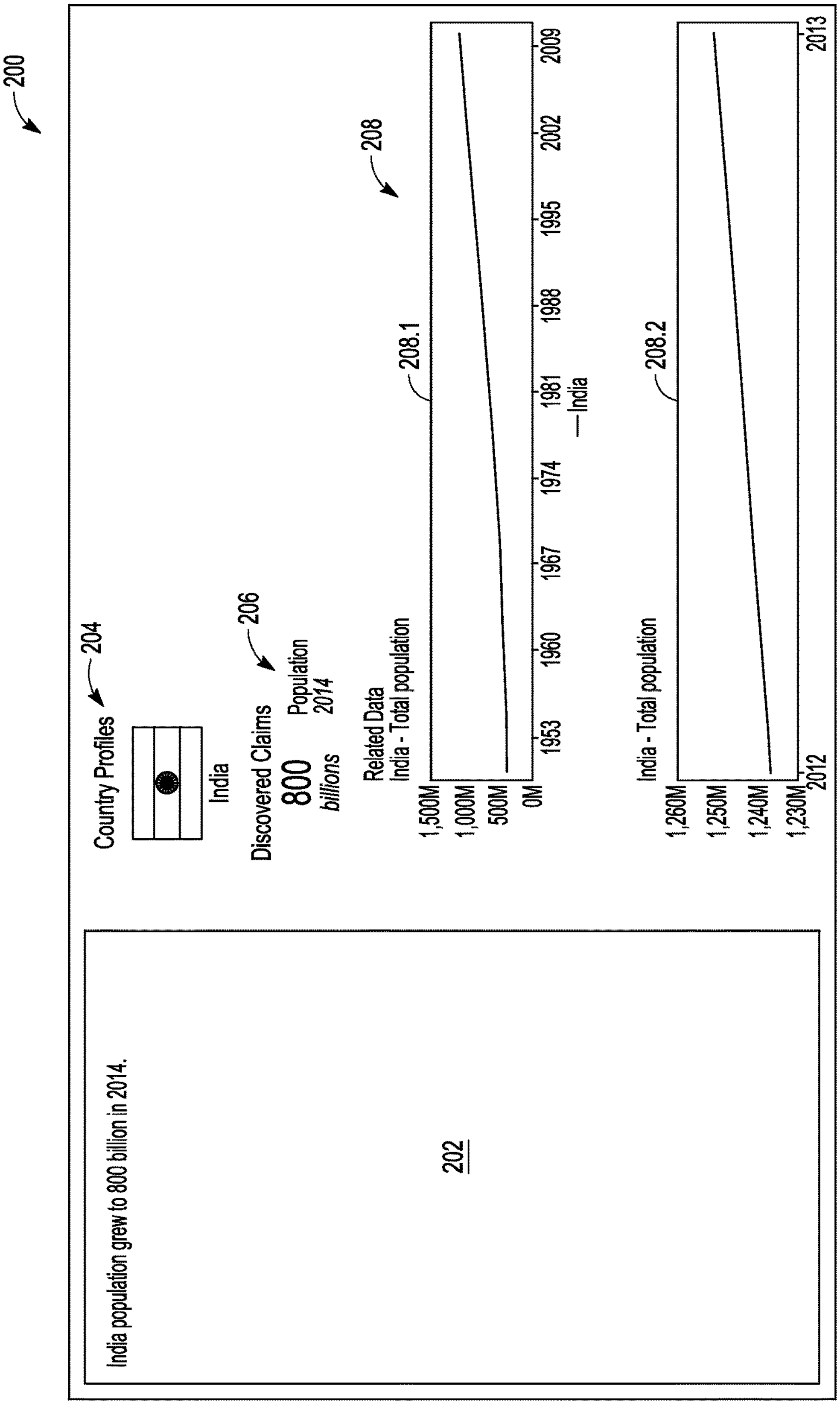
FIG. 4 shows a yet further example of the GUI of FIG. 2 including example source text and displaying data related to the source text.

FIG. 4 shows a yet further example of the GUI 200 of FIG. 2 including different example source text and displaying data related to the source text. In particular, as a user enters or types text into the document zone 202 (e.g. "India population grew to 800 billion in 2014."), the system and methods described herein automatically identify a subject matter of the text entered and identify India as a country profile as shown in the subject display zone 204. In an example embodiment, entering a "." or period triggers the automated identification process. Further, the system and methods described herein automatically identify related data in the form of discovered claims or facts (e.g. show the population to be 800 billion people) that is displayed in the discovered claims display zone 206. If, however, a user incorrectly entered the data in the document zone 202, for example, identifying the population as 600 billion, then the correct claims or facts may then be provided in the related data display zone 208 Accordingly, the system and methods described herein may be used as a fact checker where an article, or any text entered into the display zone, is analyzed and facts retrieved from a remote database (e.g. one of the databases 126 shown in FIG. 1) may be used to verify claims provided in the article. Since the user has entered the word "India" in the document zone 202, the related data displayed in the related data display zone 208 identifies the total population of India and shows a graph of how the population has progressed over the years. It is to be appreciated that as the user types or enters other key words in the document zone 202, the system and methods described herein may retrieve further related data and supplement or replace the data shown in the discovered claims display zone 206 and the related data display zone 208.

Figure 5:
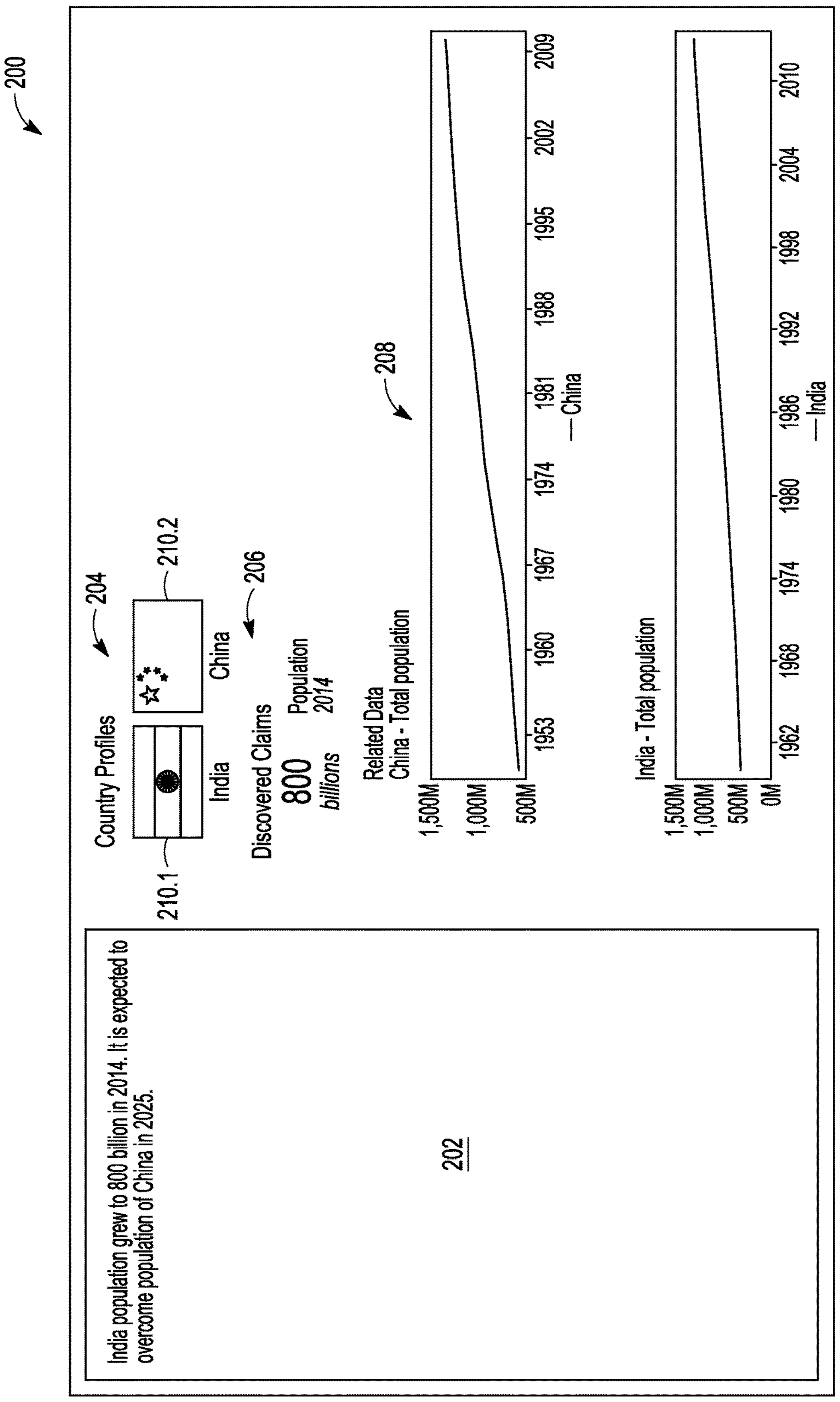
FIG. 5 shows the example GUI of FIG. 2 comparing some of the related data shown in FIG. 2 and FIG. 3.

FIG. 5 shows an example of the GUI 200 comparing some of the related data shown in FIGS. 2 and 3. As can be seen from FIG. 5, as the user enters further text in the document zone 202 (e.g. "It is expected to overcome the population of China in 2025"), the methods and systems described herein provide further related data on the fly to the text that has been entered. More particularly, as shown by way of example, the related data display zone 208 is shown to include a graph of the population growth of China and, in some example embodiments, comparative graphs are displayed.

Figure 6:
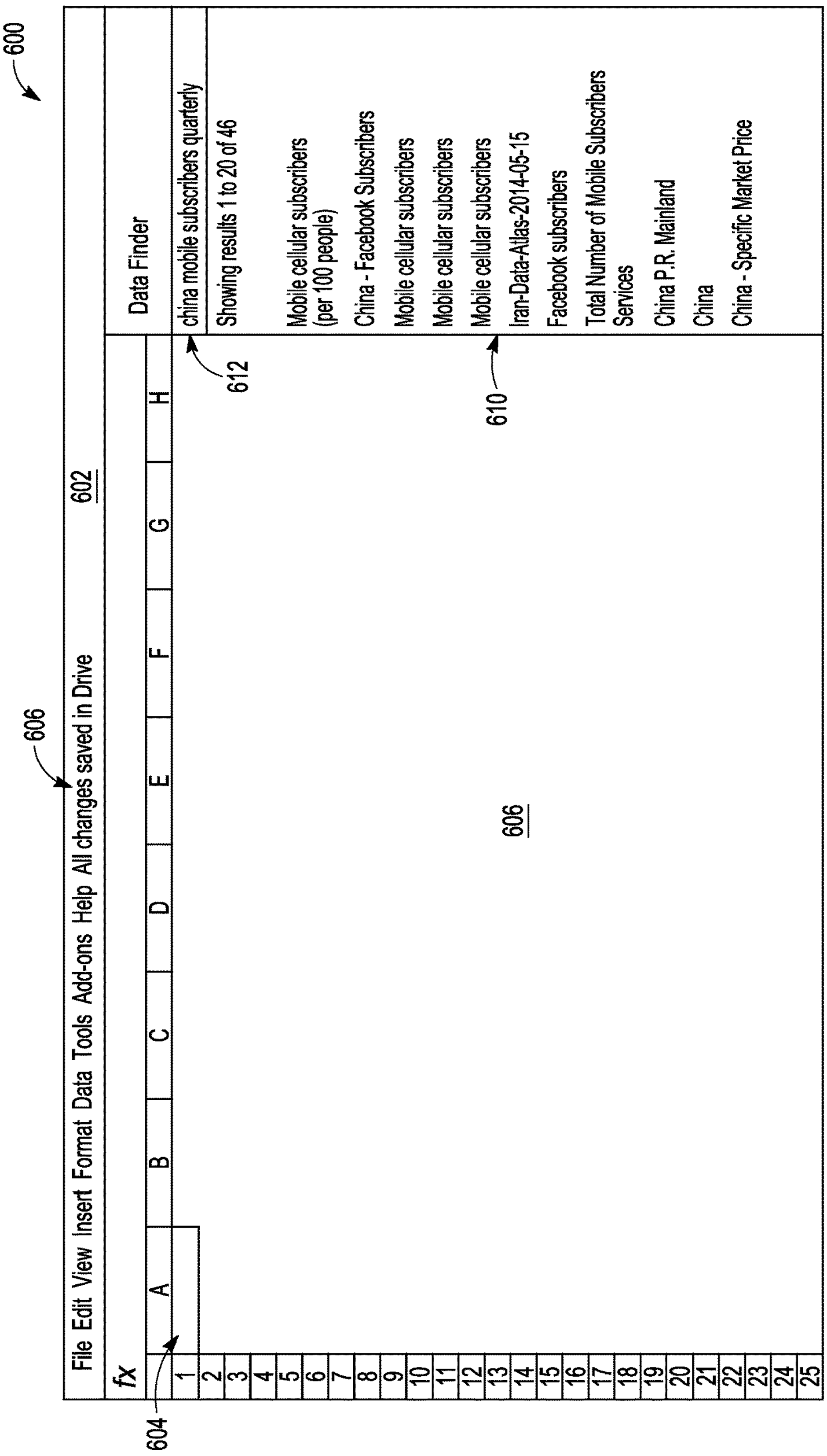
FIG. 6 shows a GUI, in accordance with an example embodiment, displaying a spreadsheet including a search field to identify related data for populating cells of the spreadsheet.

FIG. 6 is a GUI 600, in accordance with an example embodiment, displaying a spreadsheet 602 including a search field to identify related data for populating cells of the spreadsheet. The spreadsheet 602 may be a Microsoft Excel spreadsheet generated by a Microsoft Excel application and include a plurality of cells 604, a menu 606 for editing and creating spreadsheets, and so on. In an example embodiment, in accordance with an example embodiment, a related data plug-in to the Excel application is provided to automatically generate related data corresponding to data entered by a user into the spreadsheet 602. For example, the cell 604 of the spreadsheet, may define a document zone 608 (e.g., similar to the example document zone 202 in FIGS. 2-5) where a user may enter data. Upon entry of the information, related data is generated on the fly and displayed in a related data display zone 610. For example, assuming a user entered "China" in the cell 604, the plug-in would automatically identify related data as shown in the related data display zone 610.

Further, in an example embodiment, a search zone 612 is provided where a user may provide words or a sentence and the related data plug-in may then identify data specifically related to the terms or sentences that the user has entered in the display zone 610. For example, the GUI 600 is shown to include a user entering "china mobile subscribers quarterly" in the search zone 612. In response to entering the search terms, the related data plug-in identifies data related to specific information the user has entered. For example, as can be seen in the display zone 610, information regarding mobile cellular subscriptions, mobile cellular subscribers, Facebook subscribers, and the like is shown in the display zone 610.

Figure 7:
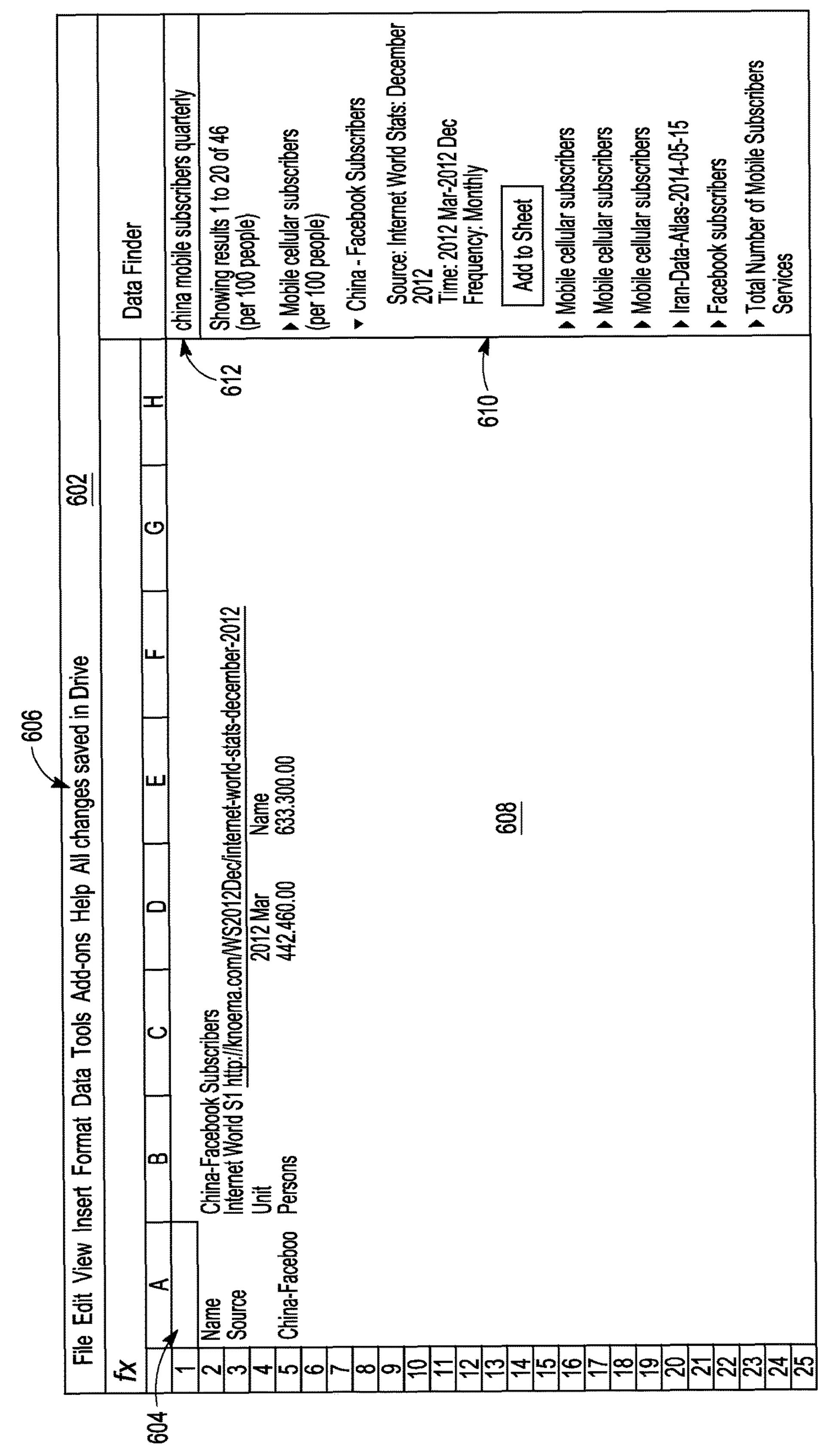
FIG. 7 shows the GUI of FIG. 6 including example source text and displaying data related to the source text.

FIG. 7 shows the GUI 600 of FIG. 6 including example source text and displaying data related to the source text. In FIG. 7, the GUI 600 is shown to include dropdown menus to allow the user to navigate and select further data for inclusion in the spreadsheet 602.

Example Discovered Claims and Related Data Functionality

In an example embodiment, the methods and systems described herein provide a tool for identifying information or facts or claims from a variety of related articles (e.g., business related articles, geopolitical articles, sports articles, and so on) stored in a database, for example, the databases 126 of FIG. 1. For example, an electronic copy of the article may be analyzed by the methods and systems described herein and automatically provide, on the fly using a machine learning model, related facts and time series information to the user. In an example embodiment, one of the source documents may be a webpage or any formatted text, and the systems and methods described herein may identify structured facts extracted from this text (e.g., displayed as discovered claims and related data—see FIG. 2) retrieved from a data repository relevant to the text.

The facts or claims may be a set of numerical values associated with some indicator and region (e.g., "United States GDP"). Each value can also be characterized with a unit (e.g., "$"), a date (e.g., "2014"), and a direction of change (e.g., "increased to," "decreased to," or any other indication of a trend). For example, the sentence "It has also planned for a budget deficit of up to 1.62 trillion Yuan ($259 billion) for the year, 270 billion yuan more than last year." contains the following facts or claims:

{"Region": null, "Indicator": "budget deficit", "Values": [
{"Value": "1.62 trillion", "Unit": "yuan", "Date": "the year", "Direction": null},
{"Value": "259 billion", "Unit": "$", "Date": "the year", "Direction": null},
{"Value": "270 billion", "Unit": "yuan", "Date": "last year", "Direction": "more"}
]}

Figure 8:
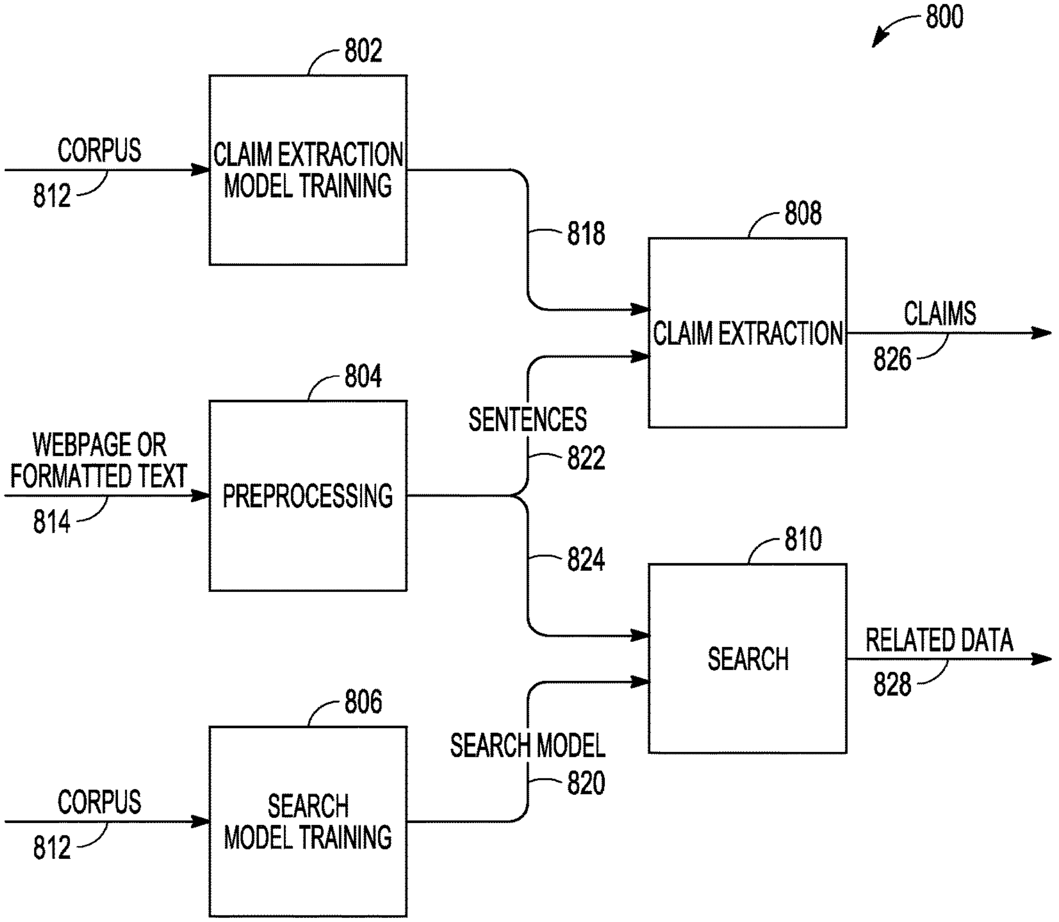
FIG. 8 is a flowchart of a method, in accordance with an example embodiment, for providing discovered claims and data related a source document.
Figure 9:
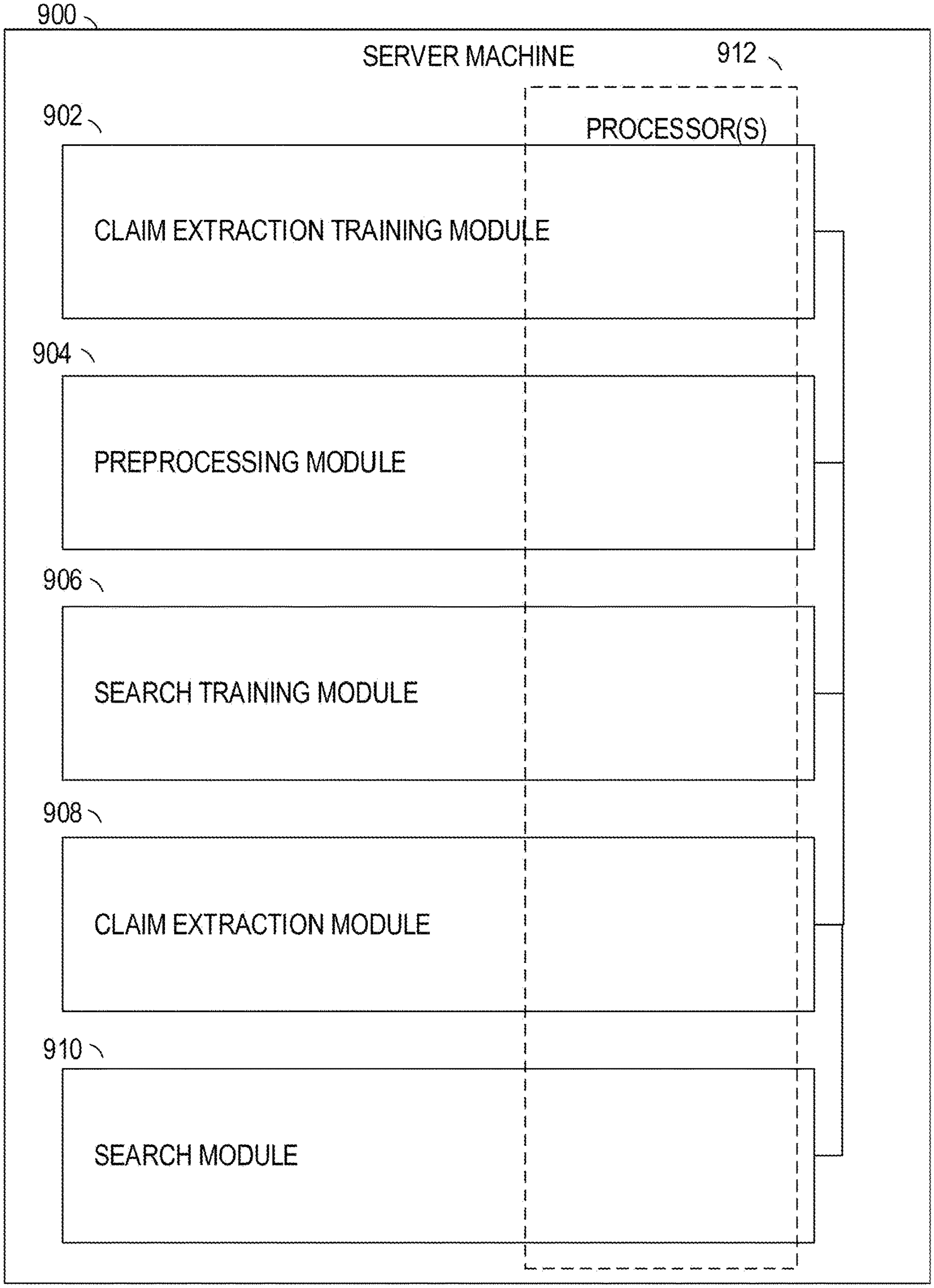
FIG. 9 is a block diagram illustrating components of a server machine, in accordance with an example embodiment, configured to provide discovered claims and data related a source document.

FIG. 8 is a flowchart of a method 800, in accordance with an example embodiment, for providing discovered claims and data related to a source document. The method 800 may be implemented by one or more of the application server(s) 140 (see in FIG. 1) and, accordingly, is described merely by way of example with reference thereto. More particularly, example components of a server machine (e.g. one or more of the training system(s) 142) are shown in FIG. 9. FIG. 9 is a block diagram illustrating components of a server machine 900, in accordance with an example embodiment, configured to provide discovered claims and data related a source document. The server machine 900 is shown to include a claim extraction training module 902, a preprocessing module 904, a search training module 906, a claim extraction module 908, and a search module 910. The modules 902-910 may execute on one or more processors 912. As the method 800 may be performed by the server machine 900, it is described merely by way of example with reference thereto.

Returning to FIG. 8, the method 800 is shown to include a claim extraction model training operation 802, a preprocessing operation 804, a search model training operation 806, a claim extraction operation 808, and a search operation 810. In the example method 800, claim extraction and searching are based on machine learning. The method 800 includes training based on a corpus 812 (e.g., articles or any other text in a specific field or subject matter). The corpus 812 provides input to both the claim extraction model training operation 802 and the search model training operation 806. Thus, in an example embodiment, the method 800 is trained on a set of examples (corpus) to produce two models using machine learning. The one model is used for claim extraction and the other is used for searching of related data. Accordingly, the claim extraction operation 808 and the search operation 810 receive inputs from both the claim extraction model training operation 802 and the search model training operation 806 (see 818 and 820).

In the example method 800, the source document is shown in the example form of a webpage or formatted text (see 814). For example, the GUI 200 may be used by the method 800 to receive a source document. For example, this source document may be provided in the document zone 202. The source document is then processed by the preprocessing operation 804 to generate outputs (e.g., sentences 822) that are fed into the claim extraction operation 808 and the search operation 810 (see 824). The method 800 provides outputs including claims (see 826) and related data (see 828). Thus, in an example embodiment, the method 800 processes a source document (e.g., a webpage or formatted text 814) and provides related to associated claims 826 and related data 828 which may then be presented and displayed to a user. For example, the user may be reading a webpage and the method 800 may then, on the fly, automatically present claims 826 and related data 828 that has been identified based on particular words present in the text of the source document.

When the source document is a webpage, the preprocessing operation 804 converts an article displayed in the webpage from Hypertext Markup Language (HTML) or formatted text to raw text. The raw text is tokenized, for example, using an OpenNLP Tokenizer. It will, however, be appreciated that any toolkit for Natural Language Processing (NLP) may be used that, for example, includes implementations of many popular NLP algorithms. OpenNLP includes analyzer chain tools for sentence detection, tokenization, parts-of-speech tagging (nouns, verbs, etc.), chunking (e.g., parsing into noun phrases, verb phrases, etc.), and named entity recognition.

Figure 10:
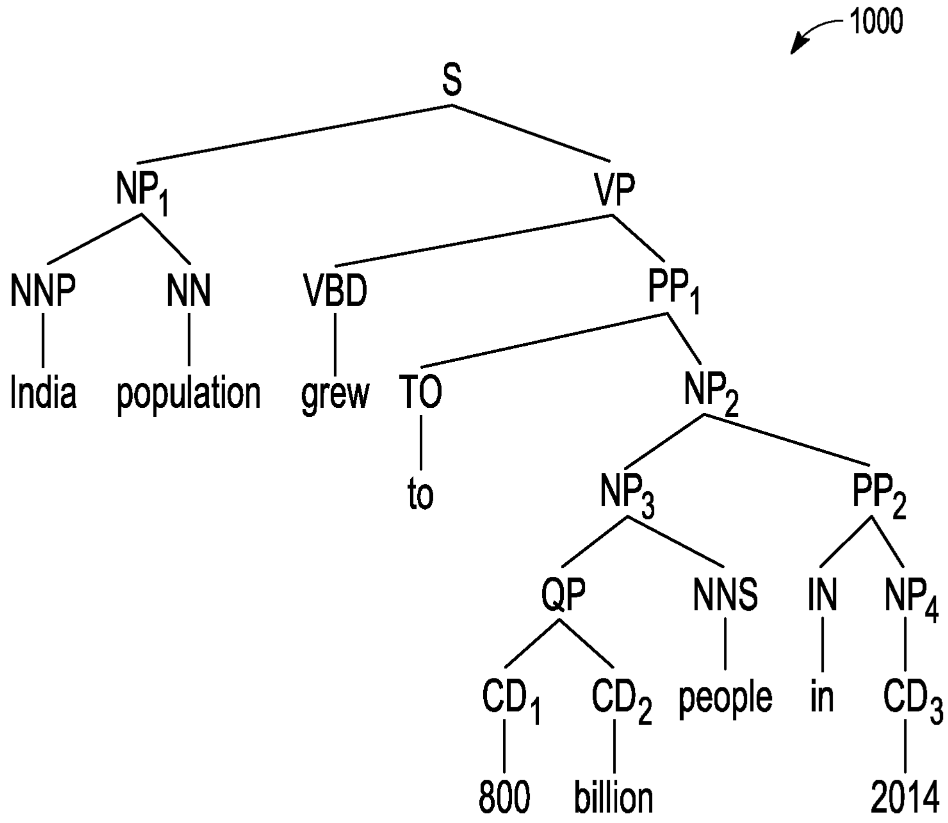
FIG. 10 is a diagram illustrating an example syntax tree used in the method of FIG. 8.
Figure 11:
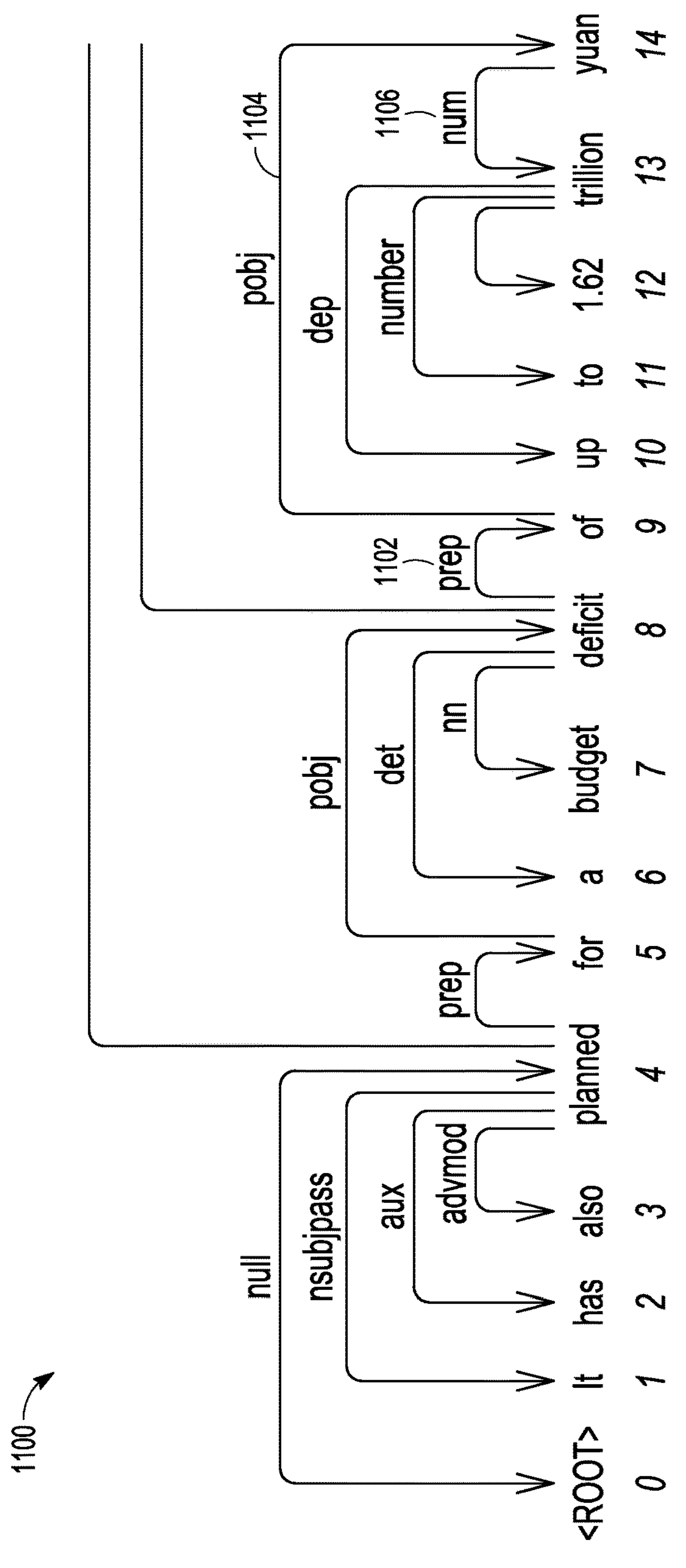
FIG. 11 is an example dependency tree used by the method of FIG. 8.

Returning to the preprocessing module 804, boundaries of sentences are determined from the tokenized raw text, for example, using an OpenNLP Sentence Detector. A Syntax tree (e.g., the syntax tree 1000 shown in FIG. 10) is then built for each sentence, for example, using an OpenNLP Parser. FIG. 11 is an example dependency tree generated by the method of FIG. 8 for an example sentence. It will be appreciated that a dependency tree may be built for each sentence in the source document.

Example Claim or Fact Extraction Model Training

Returning to the claim extraction model training operation 802 in FIG. 8, for a corpus 812 comprising a set of articles, text of each article is marked with tags. When, for example, the articles are geopolitical articles relating to different countries of the world, six tags may be used. For example, the tags may include "indicator", "region", "value", "unit", "date" and "direction". In this given example, one tag is provided for each part of a claim. Each claim may have a "value" with an attribute "id" by which it can be referenced from other tags to form relations. Other tags may have an attribute "refs" to indicate values to which the tag is related.

Following the example above, next markup may be generated:

"It has also planned for a <indicator refs="1,2,3">budget deficit</indicator> of up to <value id="1">1.62 trillion</value> <unit refs="1">yuan</unit>(<unit refs="2">$</unit><value id="2">259 billion</value>) for <date refs="1, 2">the year</date>, <value id="3">270 billion</value> <unit refs="3">yuan</unit> <direction>more</direction> than <date refs="3">last year</date>"

The claim extraction model used in the operation 808 may include two components, namely, a custom entity recognition model (which may be used to find named entities such as indicators, regions, units, etc. in the source text) and a relation extraction model (which may be used to find relationships between entities). In an example embodiment, the training operation of the claim extraction model 802 is performed in two steps. At the first step of the training operation 808, marked entities are extracted, the source document is preprocessed, and marked relations are extracted as described by way of example in more detail below.

Figure 12:
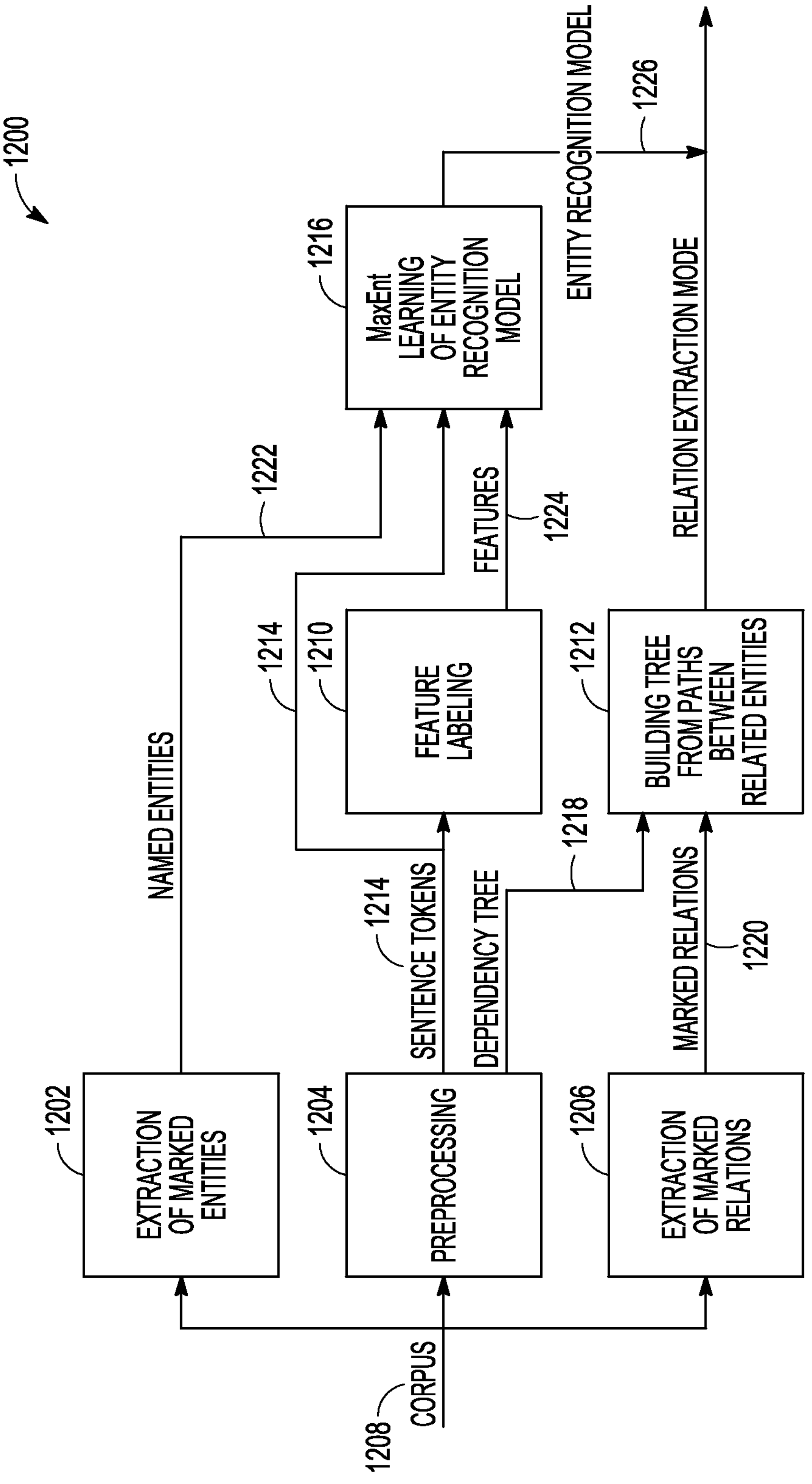
FIG. 12 is a flowchart of a method, in accordance with an example embodiment, for claim extraction from a corpus stored in a database.

FIG. 12 is a flowchart of a method 1200, in accordance with an example embodiment, for claim extraction from a corpus stored in a database (e.g., stored in the database(s) 126). The method 1200 is shown to include an extraction of marked entities operation 1202, a preprocessing operation 1204, and an extraction of marked relations operation 1206. Each of these operations 1202-1206 receives text from a source document (e.g., an article or any other document) forming part of the corpus 1208. The extraction of marked entities operation 1202 identifies entities in the source document that have been marked and removes their associated tags, and adds the entities to a collection. For example, assuming the source document includes the words "budget deficit" in text, these words and their positions within an associated sentence may then be added or stored in the collection. The preprocessing operation 1204 may, for example, function in a same or similar way to the preprocessing operation 804 shown in FIG. 8. The extraction of marked relations operation 1206 identifies relationships between the identified marked entities as well as, for example, numerical claims in the source document. Continuing the example above, the extraction of marked relations operation 1206 may identify a numerical value, for example, "1.62 trillion" related to the entity "budget deficit" and store the resultant relation in the collection.

The second step includes the feature labeling operation 1210 and the building tree from paths between related entities operation 1212. As shown in the method 1200, sentence tokens 1214 generated by the preprocessing operation 1204 are fed into the feature labeling operation 1210 as well as into the Maximum Entropy learning of entity recognition model 1216. The preprocessing operation 1204 provides the dependency tree 1218 (e.g., see FIG. 11) to the building tree from paths between related entities operation 1212. Marked relations 1220 output from the extraction of marked relations operation 1206 also feeds into the building tree from paths between related entities operation 1212.

Returning to the feature labeling operation 1210, in an example embodiment, each token range in each sentence is labeled with features. A feature includes some characteristic of a range of tokens. For example, "budget deficit" may be a range of tokens. The features may influence whether or not a range represents a named entity. Thus, tokens include a sequence of characters representing a semantic unit (e.g., every word or punctuation mark may define a token). In an example embodiment, there are however some exceptions. For example "doesn't" may include two tokens: "does" and "n't"). A token range includes any continuous sequence of tokens from a sentence and is characterized by starting and ending positions in a sentence. For example, "budget deficit" is an example of token range, which includes two tokens: "budget" and "deficit". In the example sentence this token range starts at position 7 and ends at position 8 (see FIG. 11). Tokens may or may not be entities. For example, the sentence "also planned for a" has a token range of four tokens. But this example is just a sequence of tokens and not an entity. On the other hand, the token range "budget deficit" from the same sentence is an entity as it refers to a concept of potential interest to the user.

In an example embodiment, the claim extraction model may be stored in the database(s) 126 and may include, but not limited to, the following types of features: syntax features, similarity features, and N-gram features.

Each range of tokens maybe labeled with its associated part of speech based on a syntax tree. For example the token range "a budget deficit" may be labeled with "NP" meaning that it is a Noun Phrase (see the example syntax tree 1000 shown in FIG. 10). If a range of tokens does not correspond to a whole sub-tree in syntax tree, then the least subtree which covers all of the range may be chosen. For example, the token range "budget deficit" is covered by a NP node, but since the node has an extra sub-tree with token "a", the node will be labeled "NP1". Accordingly, a number after the label "NP" is the number of extra sub-trees.

If database contains terms similar to a range of tokens, then the range may be labeled as similar to an associated entity in a database. For example, the token "yuan" will be labeled by feature "unit9" indicating that word "yuan" is present in a database table that contains units. The number "9" may signify the degree of similarity between the token and the term in the database. A degree of similarity is calculated by the formula:

Degree of similarity=Covered part*Used Part where "used part" is a fraction of tokens in a token range that correspond to a similar term in a database. The "covered part" is a fraction of the tokens from similar terms in the database that are present in the token range. For example, if a degree of similarity between a token and a term in the database is greater than 0.9, then number "9" is added to the label; if degree of similarity is less than 0.9 but greater than 0.6 then number "6" is added to the label; and so on. The third example of features used in the claim extraction model are N-gram features.

The Maximum Entropy learning of entity recognition model 1216 receives named entities 1222, sentence tokens 1214, and features 1224, which are then processed to generate an entity recognition model 1226. In an example embodiment, the maximum entropy learning of entity recognition model 1216 is an OpenNLP software module. Algorithms of the OpenNLP software model may identify optimal values for entity recognition model parameters (e.g., weight coefficients for each possible feature).

Returning to the building tree from paths between related entities operation 1212, in an example embodiment, for each marked relation (a pair of two entities) in the collection of extracted relations (see marked relations 1220), corresponding nodes in a dependence tree 1218 are determined. Thus, a path in a dependency tree between these entities is found. For example, in the dependency tree 1100, the path between entities "budget deficit" and "1.62 trillion" is identified as "+"prep"->+"pobj"->+"num" (see paths 1102, 1104, and 1106 in FIG. 11). In the given example, a plus sign ("+") indicates that the direction of a path coincides with the direction of an arc in the dependency tree 1100. Paths from all marked relations are stored in a dependency tree to facilitate searching of similar paths.

Figure 13:
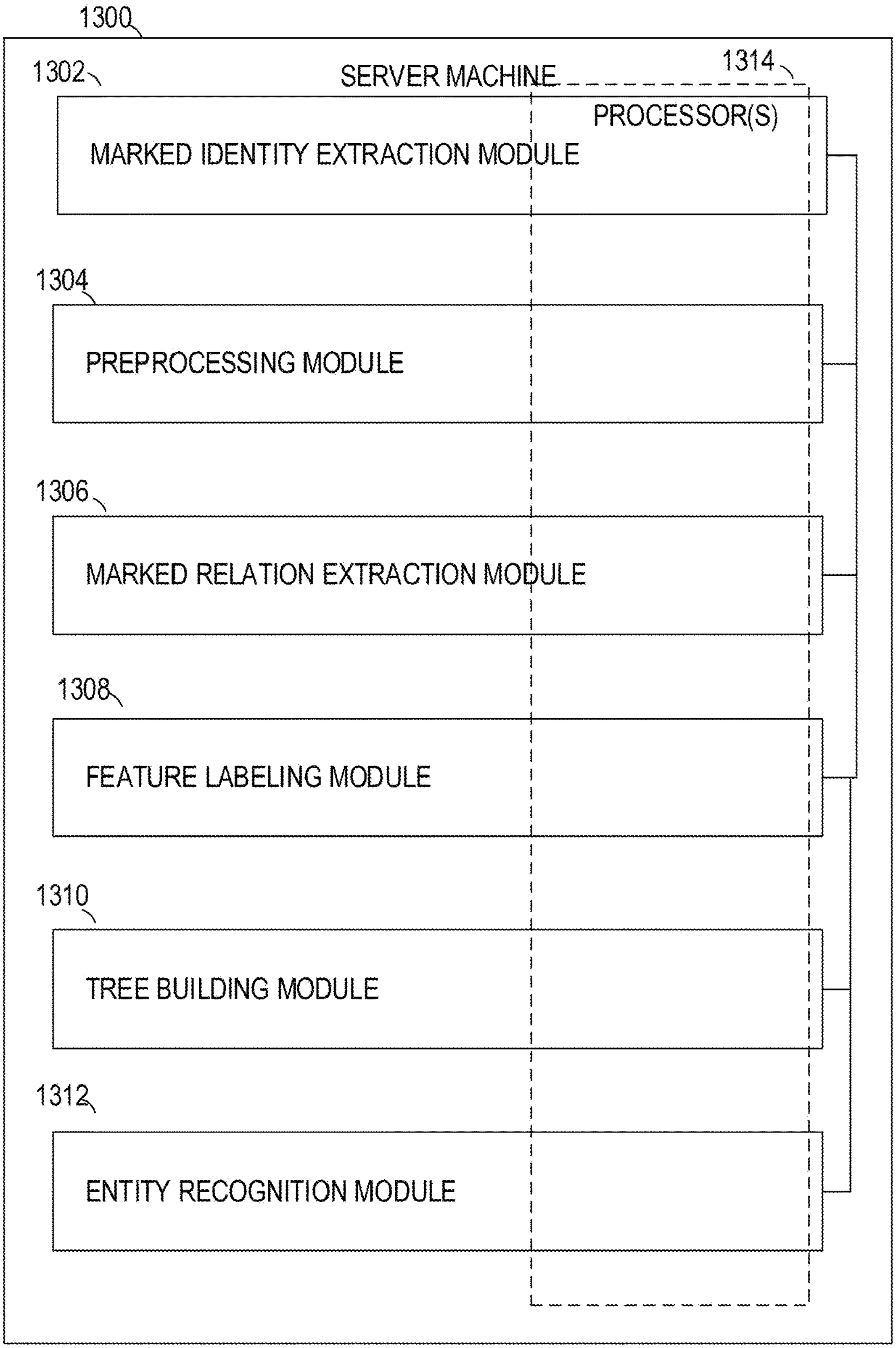
FIG. 13 is a block diagram illustrating components of a server machine, in accordance with an example embodiment, configured to perform extraction from a corpus.

FIG. 13 is a block diagram illustrating components of a server machine 1300 able to perform claim extraction. The server machine 1300 may be configured to perform the method 1200 and, accordingly, is described merely by way of example with reference thereto. The server machine 1300 is shown to include a marked entity extraction module 1302, a preprocessing module 1304, a marked relation extraction module 1306, a feature labeling module 1308, a tree building module 1310, and an entity recognition module 1312. The modules 1302-1312 execute on one or more processors 1314. It will be appreciated that, in some example embodiments, one or more of the modules 1302-1312 may be combined and further modules may be included in the server machine 1300.

The marked identity extraction module 1302 may implement the functionality of the extraction of marked entities operation 1202, the preprocessing module 1304 may perform the functionality of the preprocessing operation 1204, the marked relation extraction module 1306 may perform the functionality of the extraction of marked relations operation 1206, the feature labeling module 1308 may perform the functionality of the feature labeling operation 1210, the tree building module 1310 may perform the functionality of the building tree from paths between related entities operation 1212, and the entity recognition module 1312 may perform the functionality of the maximum entropy learning of entity recognition model 1216.

Example Fact or Claim Extraction

Figure 14:
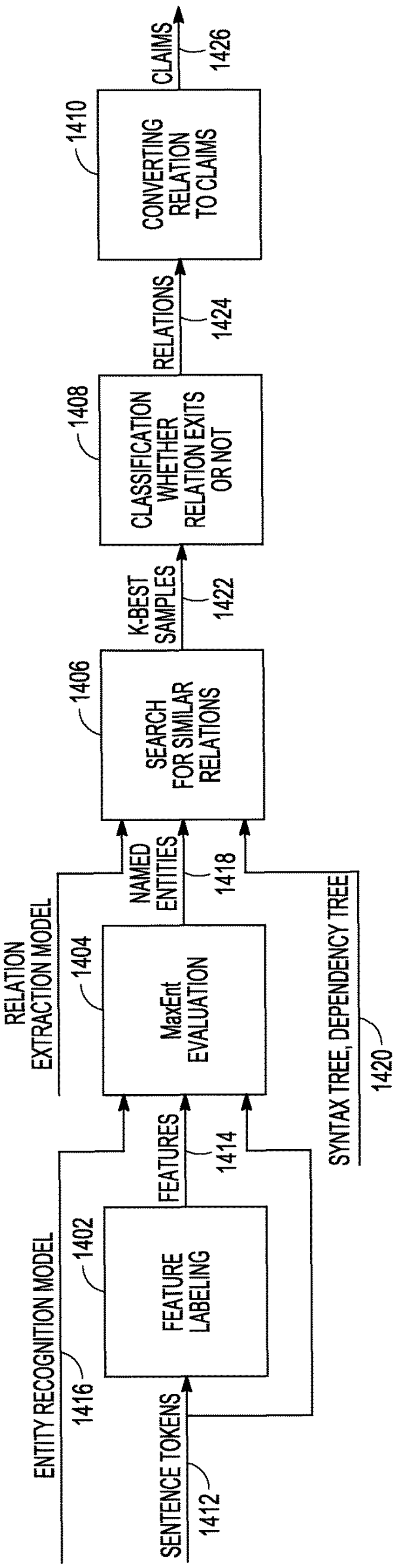
FIG. 14 is a flowchart of a method, in accordance with an example embodiment, for extracting facts or claims from sentences of a source document.

As mentioned above with reference to the GUI 200, some of the methods and systems described herein extract facts or claims from a source document and display the claims in the discovered claims display zone 206. FIG. 14 is a flowchart of a method 1400, in accordance with an example embodiment, for extracting claims from sentences in a source document (e.g., provided in the source document zone 202). The method 1400 may be performed by the claim extraction operation 1008 shown in FIG. 10. The method 1400 is shown to include a feature labeling operation 1402, a maximum entropy evaluation operation 1404, a search for similar relations operation 1406, a classification whether a relation exists or not operation 1408, and a converting relation to claims operation 1410.

In an example embodiment, claim or fact extraction requires the following inputs: pre-processed article text (e.g., tokenized with detected sentences and built syntax and dependency trees) and a claim extraction model (e.g., which comprises the entity recognition and relation extraction models). In the feature labeling operation 1402, sentence tokens 1412 are labeled with features in the same or similar way as during the claim extraction model training (see the example method 1200 of FIG. 12). The feature labeling operation 1402 produces features 1414 that are fed into the maximum entropy evaluation operation 1404. The maximum entropy evaluation operation 1404 is also shown to receive the entity recognition model 1416 (see the model 1216 in FIG. 12) and the sentence tokens 1412 and features 1414. An output of the maximum entropy evaluation operation 1404 is thus based on sentence tokens (e.g., from the preprocessing operation 1004), the labelled features 1414 determined by the feature labeling operation 1402, and the entity recognition model (see operation 1416 in FIG. 12). For each range of tokens, the probability of the range being a named entity of particular type is found using a maximum entropy evaluation algorithm available from, for example, OpenNLP. Ranges with a probability less than a threshold value may be discarded. An output of the maximum entropy evaluation operation 1404 is a collection of named entities 1418 with associated positions in the text of an article. The collection of named entities 1418 is then fed into the search for similar relations operation 1406.

In the search for similar relations operation 1406, for named entities found in the evaluation operation 1404, all possible pairs of named entities 1418 are generated. In an example embodiment, for each pair of entities, a plurality K of the most similar pairs are found. The most similar pairs may be determined in the dependency tree (e.g., see syntax tree/dependency tree 1420) from paths between related entities (see operation 1212 in FIG. 12). The similarity between the pairs may be measured by a tree kernel or any function that defines how similar two dependency trees are. The K best samples 1422, determined in operation 1406, are then fed into the classification operation 1408. The classification operation 1408 then determines whether a relation exists, or does not exist, between at least some entities. More particularly, in an example embodiment, each pair of entities is classified as a relation (or not) based on a support vector machine algorithm applied to the K best samples 1422 determined in operation 1406. The classification operation 1408 provides relations 1424 to the converting operation 1410 that converts the relations 1424 into claims 1426. The claims may then be displayed in the GUI 200 (e.g., see the discovered claims display zone 206).

Figure 15:
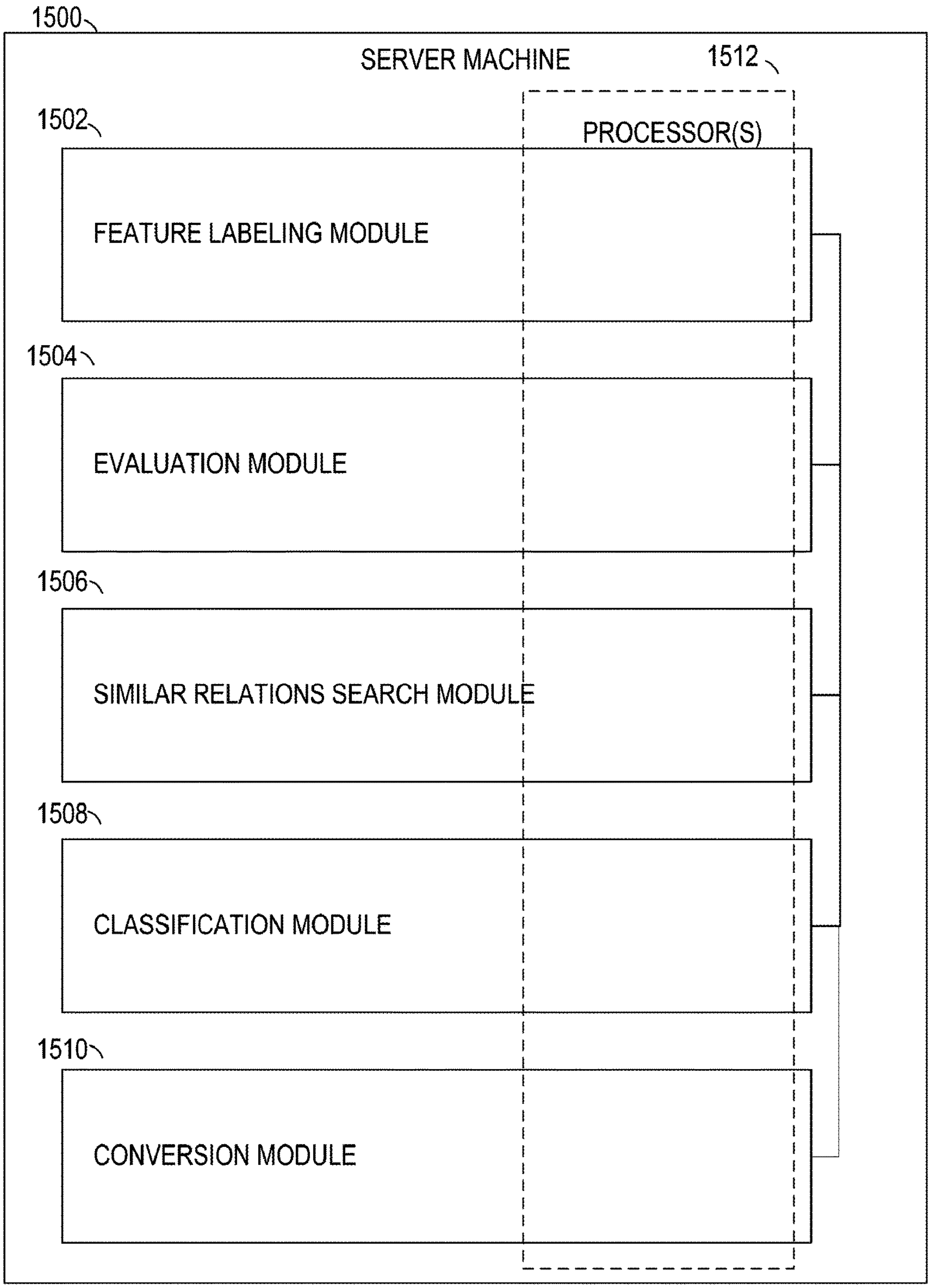
FIG. 15 is a block diagram illustrating components of a server machine, in accordance with an example embodiment, configured to extract facts or claims from sentences of a source document.

FIG. 15 is a block diagram illustrating components of a server machine 1500, in accordance with an example embodiment, configured to extract claims from sentences of a source document. The server machine 1500 may implement the method 1400 and, accordingly, is described merely by way of example with reference thereto.

The server machine 1500 is shown to include a feature labeling module 1502, an evaluation module 1504, a similar relations search module 1506, a classification module 1508, and a conversion module 1510. The modules 1502-1510 execute on one or more processors 1512. The feature labeling module 1502 may perform the functionality of the feature labeling operation 1402, the evaluation module 1504 may perform the functionality of the maximum entropy evaluation operation 1404, the similar relations search module 1506 may perform the functionality of the search for similar relations operation 1406, the classification module 1508 may perform the functionality of the classification whether relation exists or not operation 1408, and the conversion module 1510 may perform the functionality of the converting relation to claims operation 1410. It will be appreciated that one or more of the modules 1502-1510 may be combined and, in the example embodiments, further modules may be provided.

Example Related Data Search Model Training

In an example embodiment, the machine-learning model for related data search includes a set of coefficients that control a relevance of time series to natural language text. For instance, this set may contain weight coefficients for each part of speech in primary words, coefficients to calculate a weight for set of words (N-grams, see https://en.wikipedia.org/wiki/N-gram), bonus coefficients for fully covered N-grams, penalty coefficients for absent (not found) words in terms and absent (not covered) dimensions in time series, weight reduce coefficients for similar time series, etc. The weight calculation may indicate a measure of relevance of sentence and article to time series data. The machine-learning model may be trained on a corpus comprising a set of articles. It will be appreciated that the subject matter described in the training articles corresponds to the subject matter to which the requested related data pertains. Accordingly, if the system (or part of the system) is configured to provide related data on the fly for geopolitical subject matter entered into the source document zone 202 (see FIG. 2), then the training articles are articles related to geopolitical information and claims. Likewise, if the system (or part of the system) is configured to provide related data on the fly for business systems, then the training articles are articles related to business information and claims, and so on. Each article may be linked with the sample time series. For example, each article may have a list of time series keys or, for instance, identify time series words, which may uniquely identify each time series depending on time series database storage architecture. Then each linked time series may have a score of its relevance to text in a training article. Scores may be collected from experts in the specific subject matter and the articles selected by the experts.

The model training is configured to find a set of coefficients, which maximize a target function. In an example embodiment, a target function is calculated as F-measure:

$$F_\beta = \frac{(1+\beta^2)\cdot \text{true positive}}{(1+\beta^2)\cdot \text{true positive} + \beta^2 \cdot \text{false negative} + \text{false positive}},$$

where true positive is a result that indicates a given time series is related to the article, when it actually does, false positive is a result that indicates a given time series is found as related to the article, when it actually does not, false negative is when time series is not found as related to the article, while actually it is related and beta is emphasis coefficient between precision and recall. Precision is the number of correct positive results divided by the number of all positive results and Recall is the number of correct positive results divided by the number of positive results that should have been returned. So, for example, $F_2$ is measure, which weights recall higher than precision, and $F_{0.5}$ is measure, which weights precision higher than recall. Training process may be adapted to end user needs (more positive results or less negative results) by choosing this beta coefficient before training process.

It should be noted that the corpus of documents used to train a data repository may be obtained from various different sources. For example, documents relating to a specific subject matter may be obtained through searches on the Internet. Thus, in example embodiments, a data collection platform is provided to collect data on an on-going basis (e.g., on a daily or weekly basis). The documents may then be reviewed for quality by a domain expert and then be injected into one or more training systems. For example, the documents may be fed into the one or more training systems 142 (see FIG. 1), which may then process the documents using the method 1200 (see FIG. 12). Both automated and/or manual review of the source documents may be performed. The source documents in the data repository may be obtained from public and/or private data repositories.

Example Related Data Search Functionality

Figure 16:
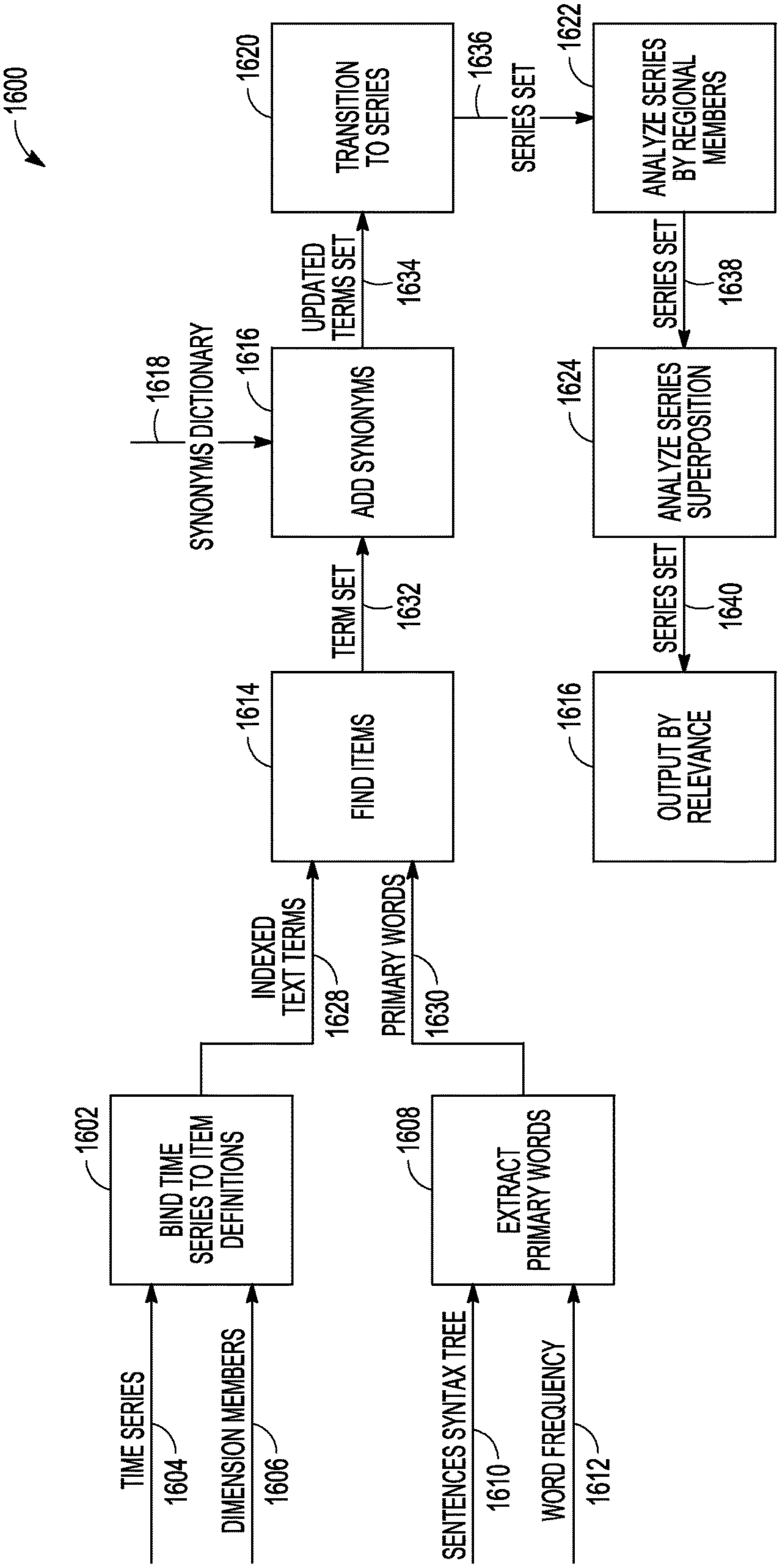
FIG. 16 is a flowchart of a method, in accordance with an example embodiment, for identifying data related to a source document.

Referring to FIG. 16, a flowchart of a method 1600, in accordance with an example embodiment, for identifying data related to a source document is shown. The method 1600 may be performed on the client-server-based network architecture 100 and, accordingly, is described merely by way of example with reference thereto. The method 1600 may use a machine learning customized repository to retrieve data related to a source document. The data repository may be stored in the one or more databases 126. In an example embodiment, the data repository includes one or more collections of datasets which include time series data representing factual values (e.g., GDP, population, value of the Dow Jones, S&P, 400, sales figures, or any other data) that vary over time with additional metadata (dimensions) to classify the datasets. In an example embodiment, the basic unit of data or information is the dataset. Each dataset may contain structured information on a specific topic and have a name, a description, a source and a publication date. It will be appreciated that the structured information may vary dependent upon the subject of the dataset. For example, a dataset corresponding to sports data will be different from a dataset corresponding to geo-political data. Optionally, users can upload their own datasets into the data repository using a dataset upload tool. For example, the third party server(s) 130 may upload customized datasets using the third party application(s) 132. Like any other resource, datasets can be shared, pinned, discussed, and so forth.

In an example embodiment, each dataset includes observations or records that hold numerical values (data) and descriptive information (metadata) about these values. Metadata may be used typically to categorize data (structural metadata) or provide additional information about data (referential metadata). In the example embodiments provided in FIGS. 3-6, a dataset that relates to different countries is accessed. Accordingly, a data repository is accessed that includes structural metadata in the form of geopolitical data including, for example, country/region information, name of indicator, and so on. Referential metadata may be used to keep various notes/comments about data. Further, data in the repository may be stored using in an appropriate ontology defining information in a certain domain (e.g., a geopolitical domain) using concepts and relationships. Different ontologies may be used in different embodiments where each ontology is customized for the particular subject matter. Thus, for example, when a user is reading (or writing) a sports-related article then a data repository with a customized sports ontology may be accessed, when a user is reading (or writing) a geopolitical article then a data repository with a customized geopolitical ontology (e.g., the data repository provided by Knoema Corporation) may be accessed, and so on.

Each dataset may have a number of associated dimensions used to categorize data in the dataset. Each dimension may be an ordered hierarchical list of values or dimension members. The dimensions of a dataset may be used as filters when accessing data. For example, if the data repository is a geopolitical data repository, a dataset including country and indicator dimensions may be provided. A user can then select all population data for United States by setting a filter to Country=United States and Indicator=Population.

The data repository, for example, stored in the database(s) 126, may include discovered claims or facts. Each discovered fact or claims can be a numerical value identified in a source document (e.g., the source text entered into the document zone 202 in FIG. 4) attributed with its name of indicator, a unit of measurement, a date, and a region. For example, the following sentence "The US government on Wednesday reported that consumer spending rose 1.9% in the first quarter" will produce discovered claim with a value of 1.9, a unit of %, a region of US, and a date of the first quarter. Further, the data repository may include related data including datasets and time series from a data repository that is relevant by meaning to the source text.

Returning to FIG. 16, the method 1600 is shown to include various example operations. More particularly, the method 1600 is shown to include a bind time series to term definitions operation 1602, an extract primary words operation 1608, a find terms operation 1614, an add synonyms operation 1616, a transition to series operation 1620, an analyze series by regional members operation 1622, an analyze series by superposition operation 1624, and an output by relevance operation 1626. In use, time series data 1604 and dimension members 1606 are fed into the bind time series to term definitions operation 1602. Example of the time series data 1604 may include "India Population", "China GDP", "Sales Data", "Electricity production from renewable sources in the World", "Growth of mobile users per population by country" and any other data that changes over time. Here examples of dimension members include "India", "China", "Population", "GDP", "Electricity production", "Mobile users". As described in more detail below, in operation 1602, time series data is bound to term definitions by the text of members, which identify the time series data.

For example, consider a dataset named "World Development Indicators" with dimensions Regions and Indicators:

| Regions |
|---|
| USA |
| China |
| India |
| Russia |

| Indicators |
| --- |
| Gross domestic product, USD |
| Population, total |
| Population growth, percent |
| Unemployment rate, percent |
| Inflation rate, percent |

The time series "China population", which is identified by members [Regions].[China] and [Indicators].[Population, total] may be bound to corresponding text terms "China" and "Population, total". Binding may be performed as indexing text terms by its words, dimension members by its text terms and, finally, indexing time series by its members.

The extract primary words operation 1608 receives a sentence syntax tree 1610, and word frequency data 1612. The operation 1608 uses a trained model (e.g., using machine learning) in which "Noun" parts of speech, which are not inside an adverb phase or a prepositional phrase, are considered as primary words for search in a machine learning trained data repository. For example, in the GUI 200 shown in FIG. 5 where both India and China are entered into the document zone 202, the method 1600 extracts the words "India" and "China" based on "Proper Noun" part of speech criteria, and "population" based on "Noun" part of speech criteria. It is to be appreciated that various other rules and criteria may be applied when analyzing the source document.

As mentioned above, the extract primary words operation 1608 receives the sentence syntax tree 1610 and the word frequency data 1612. Continuing with the example text entered into the document zone 202 shown in FIG. 5 ("India population grew to 800 billion people in 2014. It is expected to overcome China population in 2025."), it will be noted that the text includes two sentences. The first sentence "India population grew to 800 billion people in 2014" may be represented as the following example syntax tree: [S [NP [NNP India] [NN population]] [VP [VBD grew] [PP [TO to] [NP [NP [QP [CD 1600] [CD billion]] [NNS people]] [PP [IN in] [NP [CD 2014]]]]]]]. (See the syntax tree 1000 shown in FIG. 10). It should be noted that any conventional techniques can be used to construct syntax tree node tags for NLP. Indexed text terms 1628 are the output from operation 1602, and primary words 1630 are the output from operation 1608.

The indexed text terms 1628 and the primary words 1630 are fed into the find terms operation 1614. In the given example, the indexed text terms 1628 may be indexed text terms such as "China" and "Population, total", and so on. The primary words 1630 may be nouns such as "China", "India", and "Population". Returning to the example provided above, the indexed text terms 1628 are shown to be the term "Population, total" indexed by words "Population", "total" and referenced to dimension members with corresponding text, the term "Gross domestic product" indexed by words "Gross", "domestic", "product" and referenced to its corresponding dimension members, etc.

The find terms operation 1614 finds terms and sentences based on primary words. For example given above, the terms "China", "India", "Population, total", and "Population growth, percent" are found as preliminary terms. Thereafter, weights for these preliminary terms are calculated, and the terms are sorted by their associated weight for further processing. In an example embodiment, the terms "China" and "India" may have a preliminary weight bonus ratio, which is taken from a data model trained by a machine learning algorithm, as these terms are fully covered in the trained model (e.g., being elements of an ontology used in the training model. Accordingly, in an example embodiment, the ontology of the trained model may be used in determining the relevance or weight of individual terms identified in the source document. An output from the find terms operation is term set 1632.

The term set 1632 is fed into the add synonyms operation 1616, which accesses a synonym dictionary 1618 to provide an updated term set 1634 that is fed into the transition to series operation 1620. For example, if the user has entered the words "GDP" and USA" in the document zone 202, and these words have thus been included in the syntax tree, the add synonyms operation 1616 will add the term "Gross Domestic Product" for "GDP" and the term "United States of America" for "USA" to the term set 1632 to generate the updated term set 1634. In an example embodiment, experts manually compile one or more customized synonym dictionaries based on uploaded time series dimension members, for instance, simply associating in the GUI "GDP" text term with its synonym "Gross domestic product" text term and optionally specifying synonym relevance percent. It will be appreciated that different data repositories may include different customized synonym dictionaries dependent upon the subject matter upon which the systems and methods are configured to operate. For example, a data repository, and hence a synonym dictionary, may be customized or configured for business applications, sporting applications, geopolitical applications, and so on. For an example geopolitical application, the data repository may include data on agriculture, crime statistics, demographics, education, energy, the environment, foreign trade, health, land use, and so on for various territories or regions of the globe.

The transition to series operation 1620 transitions terms in the updated term set 1634 into a time series of terms and calculates a weight for the time series of terms. In an example embodiment, the weight of a series is based on the following factors: a word weight, word occurrences in series, absent words from a sentence, and terms. Each of these example factors may have a corresponding coefficient from a trained model. Example series with identifying dimension members and their associated weight words are shown in the table below, where '+' and '−' indicates respectively presented and absent in article words and indicates accordingly bonus or penalty for a time series weight. Each word weight may be calculated with a corresponding model coefficient based on its part of speech, frequency in an article, inverted frequency in the time series. Then, the word weight may be involved in the resulting time series weight with a coefficient from the trained model for presented or absent N-grams respectively.

| Region | Indicator | Weight words |
| --- | --- | --- |
| USA | Population, total | −USA + Population − total |
| China | Population, total | +China + Population − total |
| China | Population growth, total | +China + Population − growth − total |

A series set 1636 is output by the operation 1620 and fed into the analyze series by regional members operation 1622. If, for example, a region of time series is not identified in the text of an article then the weight of this time series is reduced by specific coefficient from the trained model. For the example text, the time series "USA Population" weight is reduced by a coefficient for absent regions from the trained model and the time series is finally excluded from the results as the "USA" region not being mentioned in the sample text.

In an example embodiment, the weight for a time series is reduced when the same or similar words are included in the time series data. For the example series above, the weight of time series "China Population growth" may be cut as the time series "China Population" has the same words and a cut ratio coefficient may be also taken from trained model.

An output from the operation 1622 is a series set 1638 that is fed into the analyze series superposition operation 1624. The operation 1624 provides an analyzed series set 1640 to the output by relevance operation 1626.

The output by relevance operation 1626 analyzes the series set 1640 received from the operation 1624 and selects time series data whose calculated weight exceeds a defined threshold that may be also obtained from the trained model. The time series having a weight that exceeds the defined threshold are then grouped by datasets and relevance ranges and, finally, discovered data identifiers of these groups are returned to the client in client readable format, for example, XML or JSON format for SOAP clients. The client, for example a web browser, uses received discovered data identifiers to request actual series data from the server and outputs it for display (e.g., in the related data display zone 208 of the GUI 200).

Figure 17:
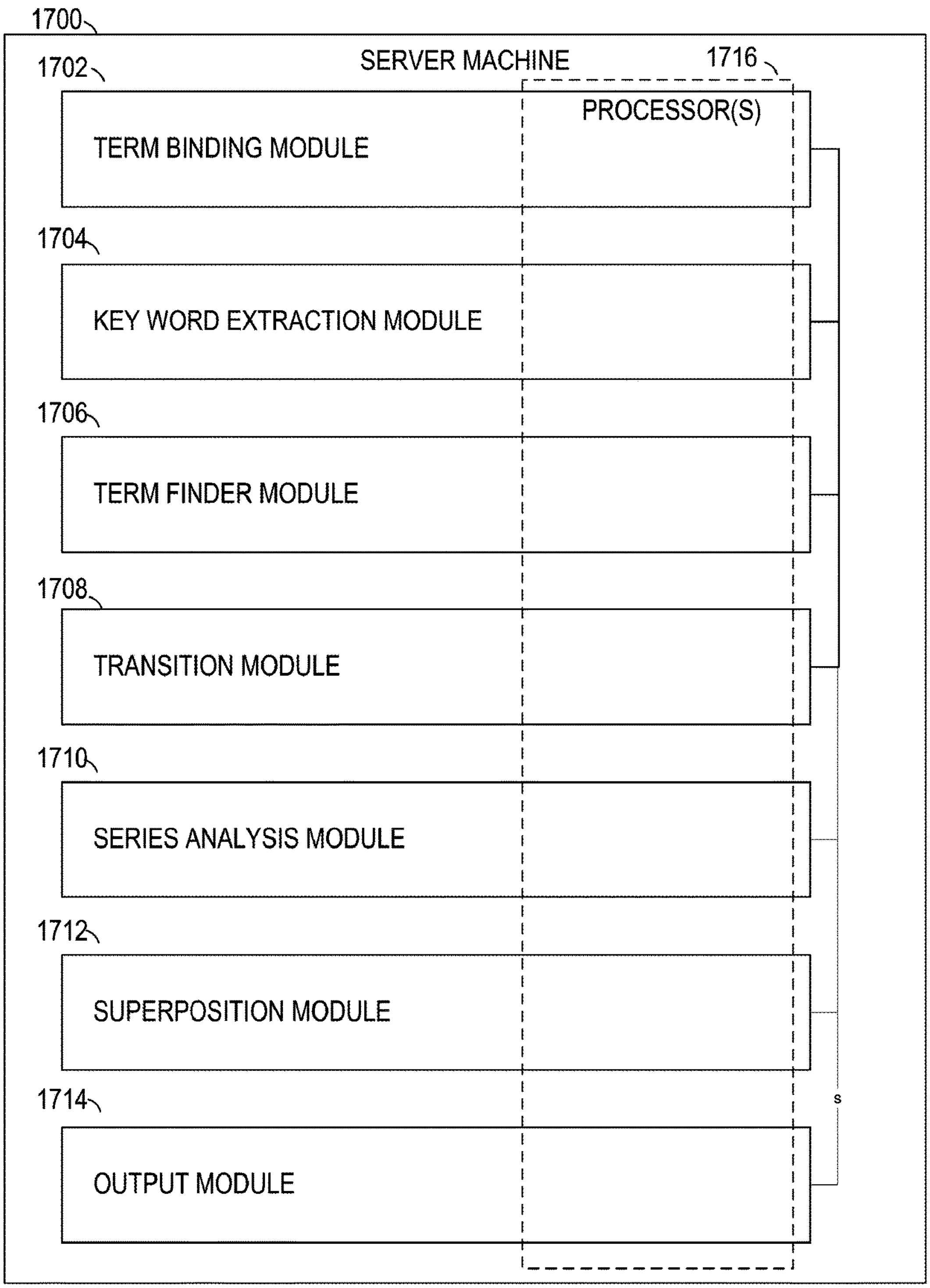
FIG. 17 is a block diagram illustrating components of a server machine, in accordance with an example embodiment, to process a source document and identify data related to the source document.

One or more specially configured hardware modules may perform the operations of the method 1600. FIG. 17 is a block diagram illustrating components of a server machine 1700, in accordance with an example embodiment, configured to process a source document and identify data related to the source document. The server machine 1700 is shown to include a term binding module 1702, a keyword extraction module 1704, a term finder module 1706, a transition module 1708, a series analysis module 1710, a superposition module 1712, and an output module 1714. The modules 1702-1714 execute on one or more processors 1716. In an example embodiment, the modules 1702-1714 execute the operations of the method 1600. More particularly, the term binding module 1702 may perform the functions performed by the bind time series to term definitions operation 1602, the keyword extraction module 1704 may perform the functions of the extract primary words operation 1608, the term finder module 1706 may perform the functions of the find terms operation 1614, and the transition module 1708 may perform the functions of the transition to series operation 1620. Further, the series analysis module 1710 may perform the functions of the analyze series by regional members operation 1622, and the superposition module 1712 may perform the functions of the analyze series superposition operation 1624. The output module 1714 may generate a GUI to provide the resultant information to a user. For example, the output module 1714 may generate a GUI the same as or similar to the GUI 200. It is to be appreciated that one or more of the modules 1702-1714 may be combined and that additional modules performing other functionality may be included in the server machine 1700. In an example embodiment, the server machine 1700 is included in the application servers 140 shown in FIG. 1.

Figure 18:
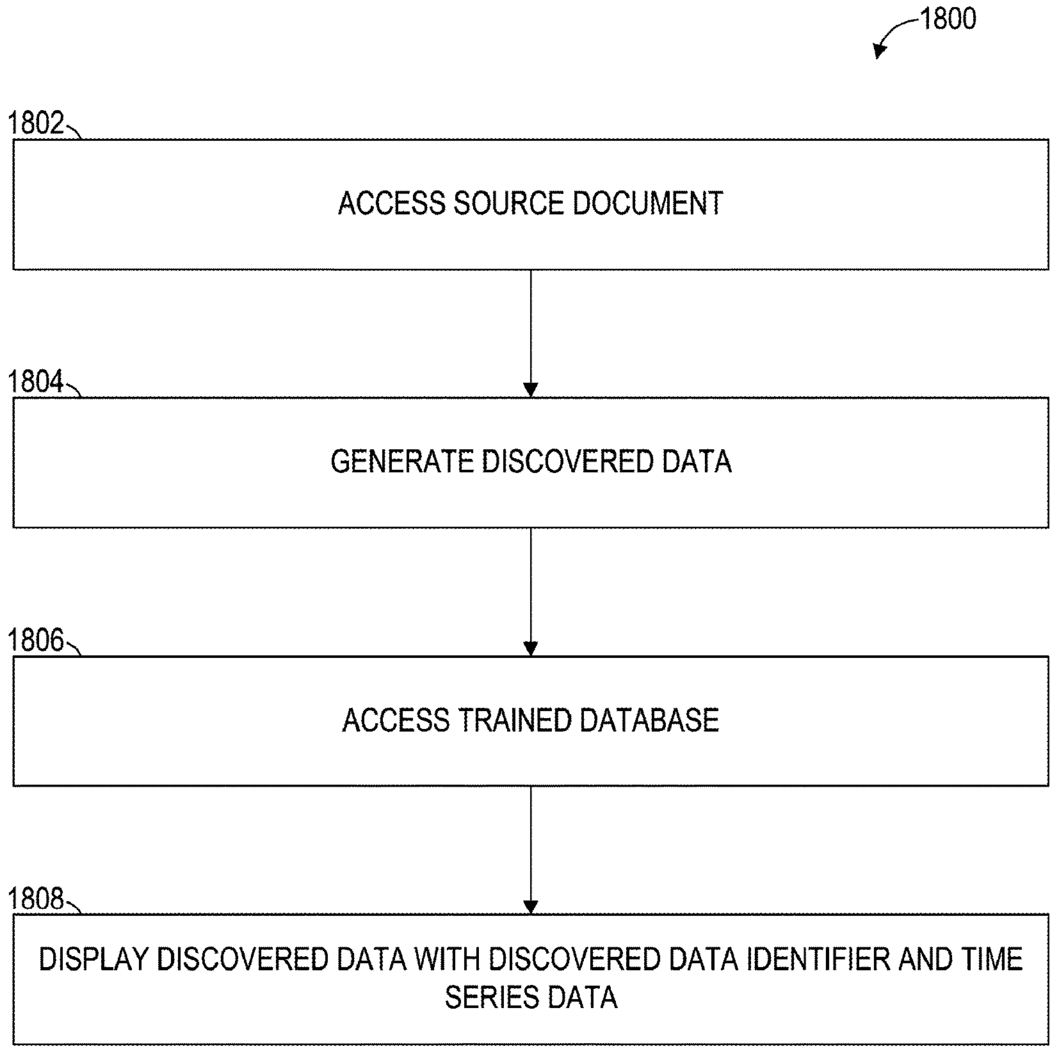
FIG. 18 is a flowchart of a method, in accordance with an example embodiment of providing information related to a source document.

FIG. 18 is a flowchart of a method 1800, in accordance with an example embodiment of providing information related to a source document. The method 1800 may be implemented on the hardware described herein and may incorporate and/or combine any one or more of the methodologies described herein.

As shown at operation 1802, in an example embodiment, the method 1800 accesses, using one or more hardware processors, a source document (e.g., the source document 202 shown in FIGS. 2-5, or the source document 606 shown in FIG. 6) that includes numerical data and text. It will be appreciated that the numerical data and the text may be displayed to a user in any GUI of any client device. Thereafter, as shown in operation 1804, using one or more hardware processors (e.g., of the client device 110 or the application server(s) 140), discovered data may be generated (e.g., see the discovered claims 206 shown in the GUI 206). The discovered data may correspond to the numerical data included in the source document. As shown in operation 1806, a database trained with a machine-learning algorithm (e.g., the database(s) 126) may be accessed (e.g., using the database server(s) 124) to identify time series data (e.g., the related data 208 shown in the GUI 200 or the related data 610 shown in the GUI 600) associated with the text. The discovered data, along with a discovered data identifier and the time series related data, are then displayed in the GUI, as shown in operation 1810. As shown by way of example in FIG. 2, the discovered data with the discovered data identifier and the time series related data can be displayed simultaneously with at least a portion of the source document in the GUI 200. Accessing of the source document, generating the discovered data, and accessing the database occur automatically on the fly without user selection.

In an example embodiment, the methods and systems described herein may be implemented in a distributed manner. Accordingly, some of the functionality may be performed server side (e.g., by the application server(s) 140) and some of the functionality may be performed client side (e.g., by the client application(s) 116). Accordingly, in an example embodiment, the source document may be received from the client device (e.g., the client device 110) via a communication network (e.g., the network 104) at a server machine (e.g., the API server 120). Thus, in an example embodiment, accessing the source document, generating the discovered data, and accessing the database may be performed at the server machine and, thereafter, the discovered data with the discovered data identifier and the time series related data may be communicated (e.g., via the network 104) to the client device 110 for display on the client device 110.

As shown, for example, in FIGS. 2-5, the GUI 200 comprises the document zone 202 displaying the source document and a discovered data display zone (e.g., the discovered claims display zone 206) configured to display numerical data. Each item displayed in the discovered data display zone is shown to include a topic identifier 210.1 that serves as the associated discovered data identifier. It should be noted that, in some example embodiments as shown in FIGS. 2-5, the related data display zone can be configured to display the discovered data with the discovered data identifier and the time series related data simultaneously with at least a portion of the source document in the GUI 200.

In an example embodiment, the method 1800, and/or any of the other methods described herein, may parse the source document for key values corresponding to reference values provided in a data repository. As mentioned herein, the GUI 200 may be presented in a web browser and, accordingly, the method 1800, and/or any of the other methods described herein, may comprise providing a plurality of hyperlinks in a webpage associated with the discovered data and the time series related data, monitoring selection of a hyperlink of the plurality of hyperlinks (e.g., using a pointing device such as a mouse or a touch-sensitive screen), and causing the display of further related data upon selection of the hyperlink (e.g., see FIG. 6). The method 1800, and/or any of the methods described herein, can be at least partially performed by a plug-in specially configured to interact with an application displaying the source document. Example source documents include a web browser, a spreadsheet application, a word processing application, an email client, or any GUI presentation engine.

Figure 19:
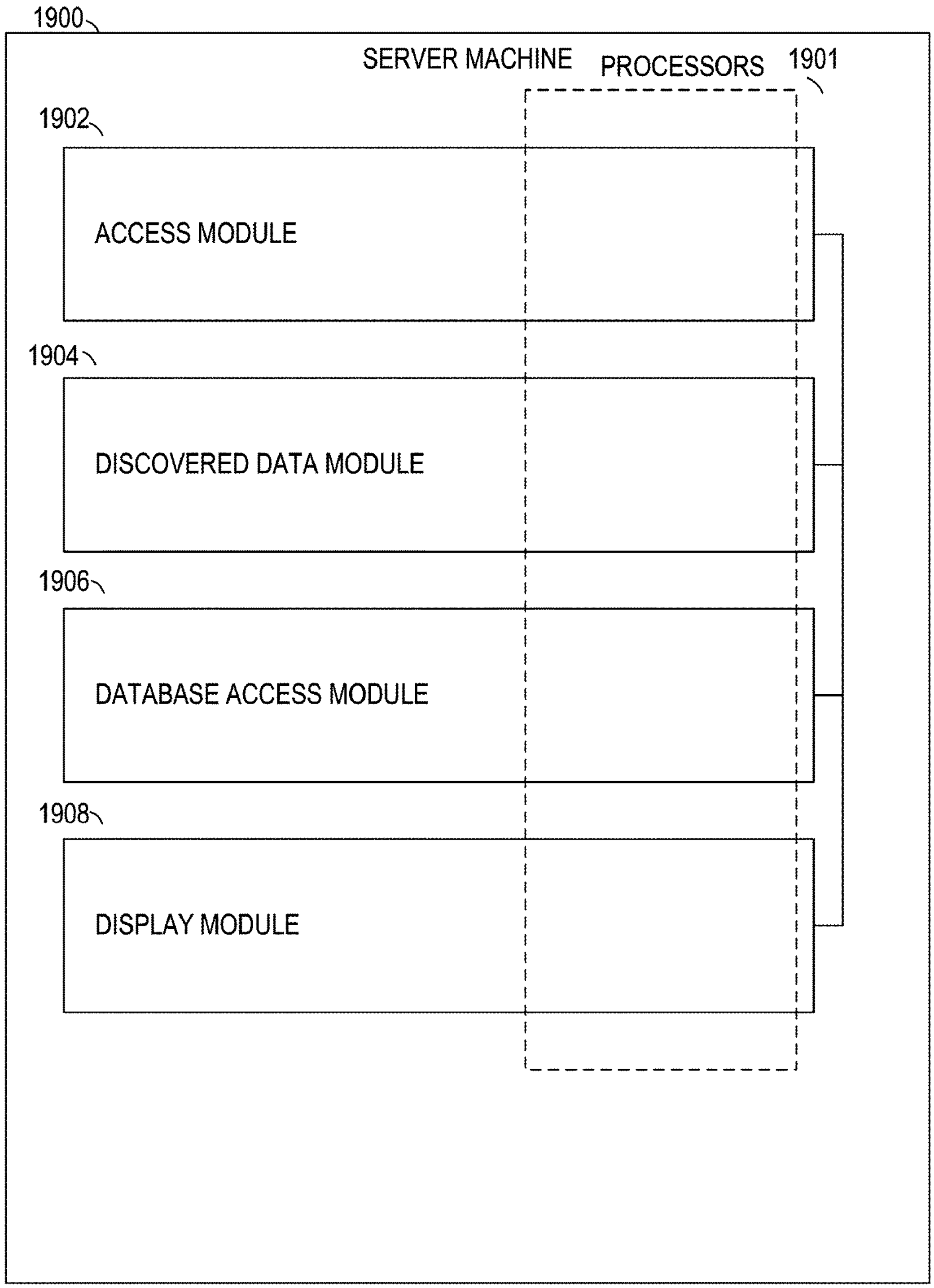
FIG. 19 is a block diagram illustrating components of system, in accordance with an example embodiment, configured to provide information related to a source document.

FIG. 19 is a block diagram illustrating components of system 1900, in accordance with an example embodiment, configured to provide information related to a source document. The system 1900 may implement the method 1800. The system 1900 is shown to include an access module 1902, a discovered data module 1904, a database access module 1906, and a display module 1908. The access module 1902 is implemented by one or more hardware processors 1901 and configured to access the source document including numerical data and text, with the source document displayed to a user in a GUI of a client device. The discovered data module 1904 may be implemented on the one or more hardware processors and configured to generate discovered data, with the discovered data corresponding to the numerical data included in the source document. The database access module 1906 may be implemented on the one or more hardware processors and configured to access a database trained with a machine learning algorithm to identify time series data related data associated with the text. The display module 1908 is configured to cause display of the discovered data with a discovered data identifier and the time series related data in the GUI. Any one or more of the modules 1902-1908 may be implemented by the client application(s) 114 and/or the application server(s) 140.

Figure 20:
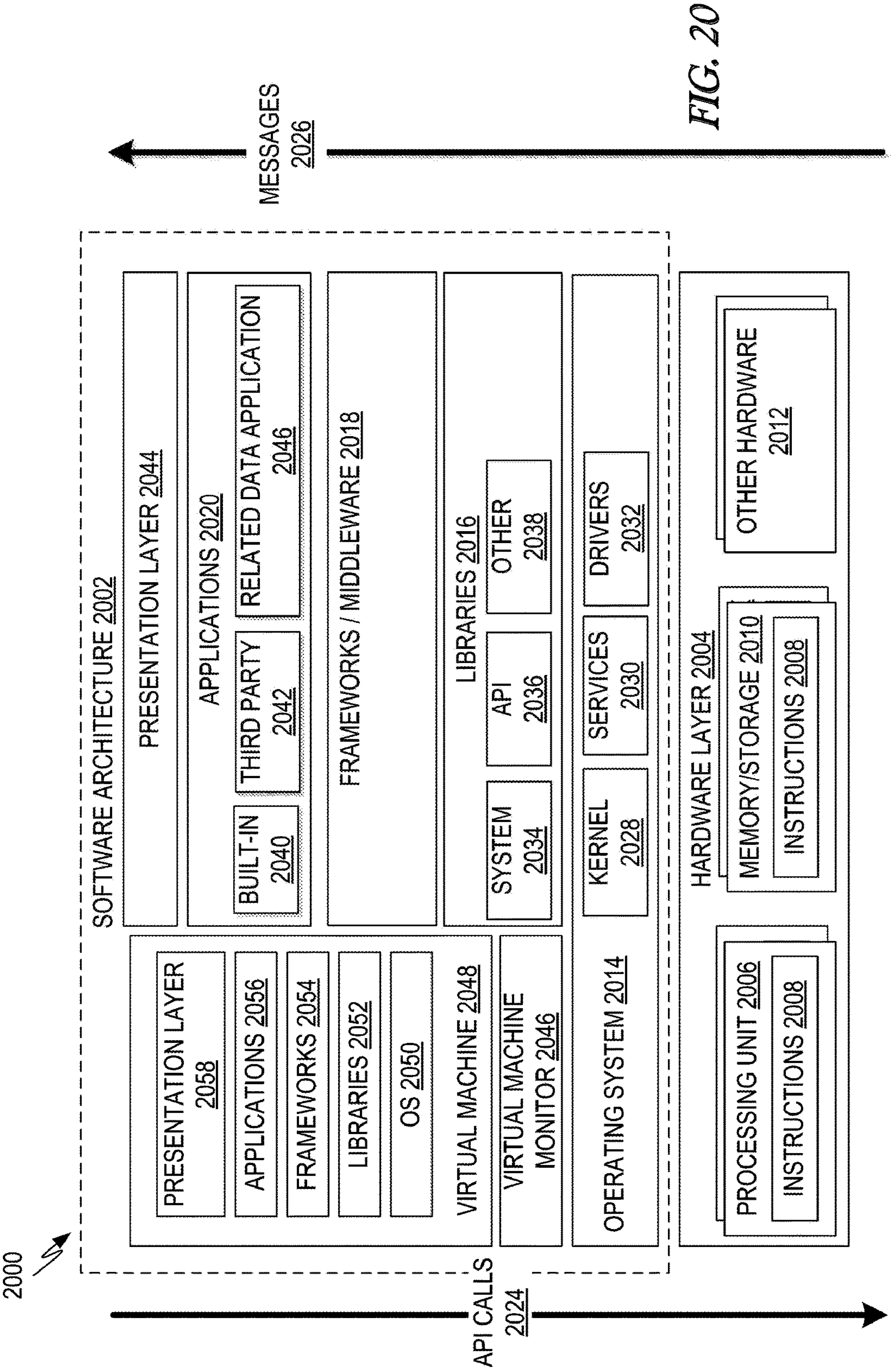
FIG. 20 is a block diagram illustrating an example of a software architecture that may be installed on a machine, according to some example embodiments.

FIG. 20 is a block diagram 2000 illustrating a representative software architecture 2002, which may be used in conjunction with various hardware architectures herein described. FIG. 20 is merely a non-limiting example of a software architecture and it will be appreciated that many other architectures may be implemented to facilitate the functionality described herein. The software architecture 2002 may be executing on hardware such as a machine 2100 (see FIG. 21) that includes, among other things, processors 2110, memory 2130, and I/O components 2150. Returning to FIG. 20, a representative hardware layer 2004 is illustrated and can represent, for example, the machine 2100 of FIG. 21. The representative hardware layer 2004 comprises one or more processing units 2006 having associated executable instructions 2008. The executable instructions 2008 represent the executable instructions of the software architecture 2002, including implementation of the methods, modules, and GUIs of FIGS. 1-19. The hardware layer 2004 also includes memory and/or storage modules 2010, which also have executable instructions 2008. The hardware layer 2004 may also comprise other hardware as indicated by 2012 which represents any other hardware of the hardware layer 2004, such as the other hardware illustrated as part of the machine 2100.

In the example architecture of FIG. 20, the software architecture 2002 may be conceptualized as a stack of layers where each layer provides particular functionality. For example, the software architecture 2002 may include layers such as an operating system 2014, libraries 2016, frameworks/middleware 2018, applications 2020, and a presentation layer 2044. Operationally, the applications 2020 and/or other components within the layers may invoke API calls 2024 through the software stack and receive a response, returned values, and so forth illustrated as messages 2026 in response to the API calls 2024. The layers illustrated are merely representative and not all software architectures have all layers. For example, some mobile or special purpose operating systems may not provide a frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, flash memory drivers, serial communication drivers (e.g., Universal Serial Bus (USB) drivers), power management drivers, and so forth, depending on the hardware configuration.

The libraries 2016 may provide a common infrastructure that may be used by the applications 2020 and/or other components and/or layers. The libraries 2016 typically provide functionality that allows other software modules to perform tasks in an easier fashion than to interface directly with the underlying operating system 2014 functionality (e.g., the kernel 2028, the services 2030, and/or the drivers 2032). The libraries 2016 may include system libraries 2034 (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks 2018 may provide various GUI functions (e.g., to generate the GUI 200), high-level resource management, high-level location services, and so forth. The frameworks 2018 may provide a broad spectrum of other APIs that may be utilized by the applications 2020 and/or other software components/modules, some of which may be specific to a particular operating system or platform.

The applications 2020 are shown to include built-in applications 2040, third party applications 2042, and related data applications 2046 that perform one or more of the methods described herein. Examples of representative built-in applications 2040 may include, but are not limited to, a contacts application, a browser application, a book reader application, a location application, a media application, a messaging application, and/or a game application. Third party applications 2042 may include any of the built in applications as well as a broad assortment of other applications. The third party applications 2042 may operate in conjunction with the third party server(s) 130 of FIG. 1.

The applications 2020 may use built in operating system functions (e.g., the kernel 2028, the services 2030, and/or the drivers 2032), the libraries (e.g., the system 2034, the APIs 2036, and the other libraries 2038), and the frameworks/middleware 2018 to create user interfaces to interact with users of the system. Interactions with a user may occur through the presentation layer 2044.

Some software architectures utilize virtual machines. In the example of FIG. 20, this is illustrated by a virtual machine 2048. A virtual machine creates a software environment where applications/modules can execute as if they were executing on a hardware machine (such as the machine of FIG. 21). The virtual machine 2048 is shown to be hosted by the operating system 2014 and may have a virtual machine monitor 2046, which manages the operation of the virtual machine as well as the interface with the host operating system 2014. A software architecture executes within a virtual machine operating system 2050, libraries 2052, frameworks/middleware 2054, applications 2056, and/or a presentation layer 2058. These layers of software architecture executing within the virtual machine 2048 can be the same as corresponding layers previously described or may be different.

Figure 21:
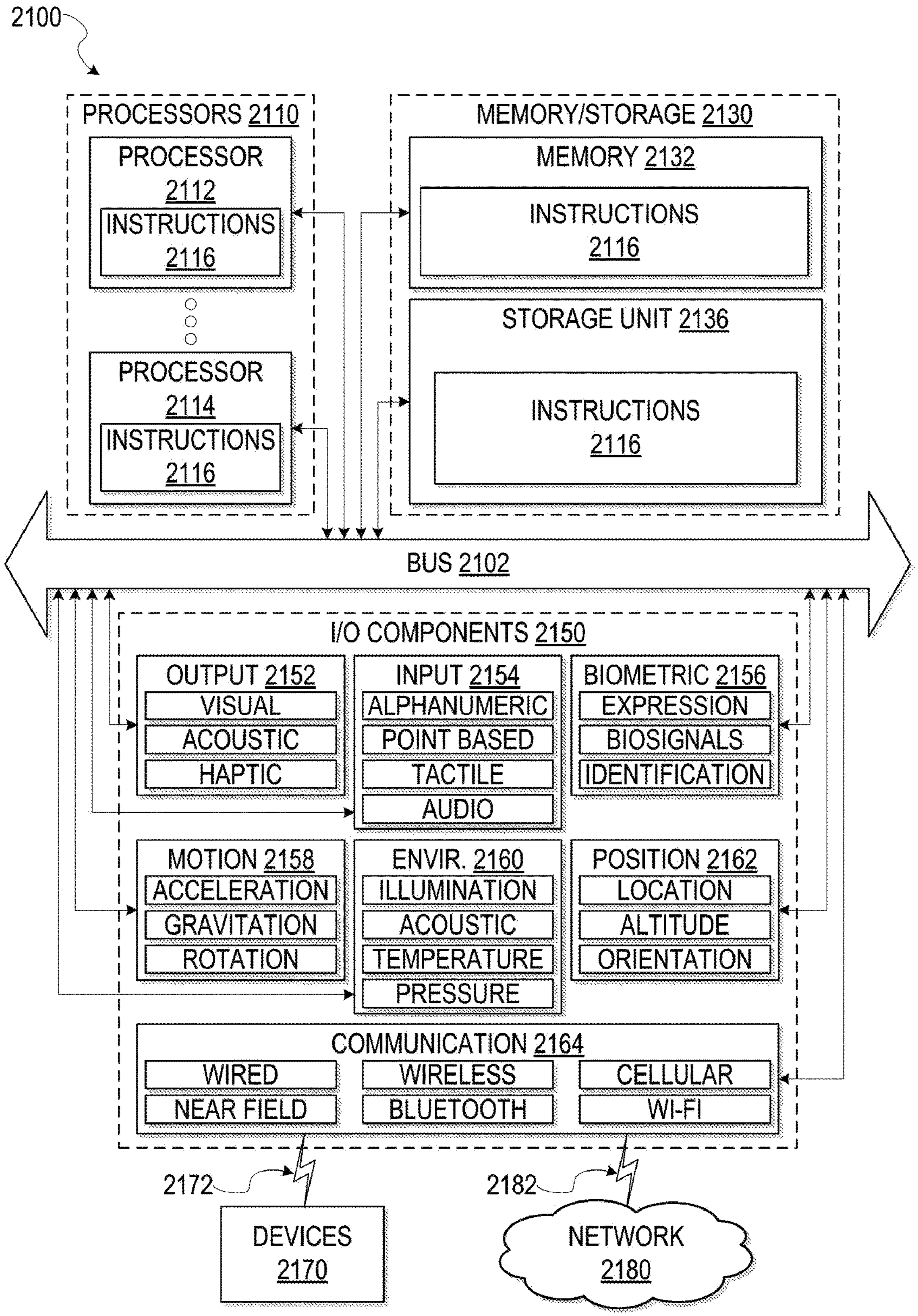
FIG. 21 illustrates a diagrammatic representation of a computer system, in accordance with an example embodiment, within which a set of instructions is executed for causing the machine to perform any one or more of the methodologies discussed herein.

FIG. 21 is a block diagram illustrating components of the machine 2100, according to some example embodiments, able to read instructions from a machine-readable medium (e.g., a machine-readable storage medium) and perform any one or more of the methodologies discussed herein. More specifically, FIG. 21 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. For example the instructions may cause the machine to execute the flow diagrams of FIGS. 8, 10, 12, and 15 (and any other functionality described herein). Additionally, or alternatively, the instructions may implement the modules shown in FIGS. 9, 11, and 14 (and any other functionality described herein). The instructions transform the general, non-programmed machine into a particular machine programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a mobile device, or any machine capable of executing the instructions 2116, sequentially or otherwise, that specify actions to be taken by machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory 2130, and I/O components 2150, which may be configured to communicate with each other such as via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 2112 and processor 2114 that may execute instructions 2116. The term "processor" is intended to include multi-core processor that may comprise two or more independent processors (sometimes referred to as "cores") that may execute instructions contemporaneously. Although FIG. 21 shows multiple processors, the machine 2100 may include a single processor with a single core, a single processor with multiple cores (e.g., a multi-core process), multiple processors with a single core, multiple processors with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of processors 2110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine will depend on the type of machine. For example, portable machines such as mobile phones will likely include a touch input device or other such input mechanisms, while a headless server machine will likely not include such a touch input device. It will be appreciated that the I/O components 2150 may include many other components that are not shown in FIG. 21. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components.

Communication may be implemented using a wide variety of technologies. The I/O components 2150 may include communication components 2164 operable to couple the machine 2100 to a network 2180 or devices 2170 via coupling 2182 and coupling 2172, respectively. For example, the communication components 2164 may include a network interface component or other suitable device to interface with the network 2180. In further examples, communication components 2164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a USB).

Moreover, the communication components 2164 may detect identifiers or include components operable to detect identifiers. For example, the communication components 2164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as, location via Internet Protocol (IP) geo-location, location via Wi-Fi® signal triangulation, location via detecting a NFC beacon signal that may indicate a particular location, and so forth.

In various example embodiments, one or more portions of the network 2180 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or other type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to devices 2170. The term "transmission medium" shall be taken to include any intangible medium that is capable of storing, encoding, or carrying instructions 2116 for execution by the machine 2100, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of providing information related to a source document, the method comprising:

receiving the source document from a client device via a communication network;

accessing, using one or more hardware processors, the source document including numerical data and text, the source document displayed to a user in a graphical user interface (GUI) of the client device;

generating, using the one or more hardware processors, discovered data that relates to the numerical data included in the source document, the generating the discovered data comprising generating the discovered data based on at least a machine learning model trained on a corpus that includes articles in a domain related to the source document;

accessing, using the one or more hardware processors, a first database trained with a machine learning algorithm to identify time series related data associated with the text;

accessing a second database including verified numerical data;

comparing the discovered data with the verified numerical data;

based on the comparison, verifying an accuracy of the discovered data to generate a verification indicator;

communicating the discovered data with a discovered data identifier, the time series related data, a hyperlink to a webpage associated with at least the discovered data, and the verification indicator to the client device, via the communication network, for display in the GUI of the client device; and communicating further related data to the client device, via the communication network, upon the user selecting the hyperlink.

2. The method of claim 1, wherein the display of the discovered data with the discovered data identifier, the time series related data, the hyperlink, and the verification indicator is displayed simultaneously with at least a portion of the source document in the GUI of the client device.

3. The method of claim 1, wherein the accessing of the source document, the generating the discovered data, and the accessing the first database occurs automatically on the fly without user selection.

4. The method of claim 1, wherein the GUI of the client device comprises:

a document zone displaying the source document;

a discovered data display zone configured to display the numerical data and the discovered data identifier associated with the numerical data; and a related data display zone configured to display the time series related data, wherein the discovered data, the discovered data identifier, and the time series related data are displayed simultaneously with at least a portion of the source document in the GUI of the client device.

5. The method of claim 1, further comprising preprocessing the source document using a natural language processing algorithm.

6. The method of claim 1, wherein the generating the discovered data further comprises:

accessing sentences including extracted from the source document, the sentences including the numerical data and the text; and generating the discovered data based on at least the machine learning model, the numerical data, and the text.

7. The method of claim 1, wherein the identifying the time series related data comprises:

accessing data in the machine-learning model;

accessing sentences including extracted from the source document, the sentences including the numerical data and the text; and generating the time series related data based on both the machine-learning model and the numerical data and text from the source document.

8. The method of claim 1, wherein the time series related data is displayed in one or more graphs in the GUI of the client device.

9. The method of claim 1, wherein the generating the discovered data further comprises:

searching for similar relations for named entities based on the named entities derived from the source document, a syntax tree and a dependency tree derived from the source document, and a relation extraction model;

classifying at least some of the similar relations; and converting the classified relations to define the discovered data.

10. The method of claim 1, wherein the accessing the first database trained with the machine-learning algorithm to identify time series related data associated with the text further comprises:

identifying primary words from sentences extracted from the source document;

indexing terms of the text;

identifying terms from the indexed terms and the primary words to obtain a term set;

transitioning the terms set to a series set; and generating related data based on relevance of the series set.

11. The method of claim 1, further comprising parsing the source document for key values corresponding to reference values provided in a data repository.

12. The method of claim 1, wherein the method is at least partially performed by a plug-in specially configured to interact with an application displaying the source document.

13. The method of claim 1, wherein the source document is displayed in an application selected from a group consisting of a web browser, a spreadsheet application, a word processing application, and an email client.

14. A computerized system comprising:

receiving the source document from a client device via a communication network;

an access module implemented by one or more hardware processors and configured to access a source document including numerical data and text, the source document displayed to a user in a graphical user interface (GUI) of the client device;

a discovered data module implemented by the one or more hardware processors and configured to generate discovered data that relates to the numerical data included in the source document, the generating the discovered data comprising generating the discovered data based on at least a machine learning model trained on a corpus that includes articles in a domain related to the source document;

a database access module implemented by the one or more hardware processors and configured to access a first database trained with a machine learning algorithm to identify time series related data associated with the text, and to access a second database including verified numerical data;

a comparison module implemented by the one or more hardware processors and configured to compare the discovered data with the verified numerical data and verifying an accuracy of the discovered data based on the comparison of the discovered data with the verified numerical data to generate a verification indicator; and a display module implemented by the one or more hardware processors and configured to communicate the discovered data with a discovered data identifier, the time series related data, a hyperlink to a webpage associated with at least the discovered data, and the verification indicator to the client device, via the communication network, for display in the GUI of the client device, and to communicate further related data to the client device, via the communication network, upon the user selecting the hyperlink.

15. A non-transitory machine-readable storage medium comprising instructions that, when executed by one or more processors of a machine, cause the machine to perform operations comprising:

receiving the source document from a client device via a communication network;

accessing, using one or more hardware processors, a source document including numerical data and text, the source document displayed to a user in a graphical user interface (GUI) of the client device;

generating, using the one or more hardware processors, discovered data that relates to the numerical data included in the source document, the generating the discovered data comprising generating the discovered data based on at least a machine learning model trained on a corpus that includes articles in a domain related to the source document;

accessing, using the one or more hardware processors, a first database trained with a machine learning algorithm to identify time series related data associated with the text;

accessing a second database including verified numerical data;

comparing the discovered data with the verified numerical data;

based on the comparison, verifying an accuracy of the discovered data to generate a verification indicator;

communicating the discovered data with a discovered data identifier, the time series related data, a hyperlink to a webpage associated with at least the discovered data, and the verification indicator to the client device, via the communication network, for display in the GUI of the client device; and communicating further related data to the client device, via the communication network, upon the user selecting the hyperlink.

* * * * *